(12) United States Patent
Norouzian Ghahfarokhi

(10) Patent No.: US 9,358,492 B2
(45) Date of Patent: Jun. 7, 2016

(54) CARBON NANO TUBE INTELLIGENT FILTER FOR ADSORPTION OF POLLUTANTS AND HYDROCARBONS IN ENVIRONMENT AND RECOVERY TO EXCELLENT INDUSTRIAL CARBON

(71) Applicant: Rasoul Norouzian Ghahfarokhi, Tehran (IR)

(72) Inventor: Rasoul Norouzian Ghahfarokhi, Tehran (IR)

( * ) Notice: Subject to any disclaimer, the term of this patent is extended or adjusted under 35 U.S.C. 154(b) by 151 days.

(21) Appl. No.: 13/742,381

(22) Filed: Jan. 16, 2013

(65) Prior Publication Data

US 2014/0017131 A1 Jan. 16, 2014

(51) Int. Cl.

| | | |
|---|---|---|
| *B01D 53/04* | (2006.01) | |
| *C01B 31/02* | (2006.01) | |
| *B01D 53/82* | (2006.01) | |
| *B01D 53/92* | (2006.01) | |
| *B01D 53/86* | (2006.01) | |
| *B01D 53/94* | (2006.01) | |
| *B05D 1/02* | (2006.01) | |
| *B05D 3/02* | (2006.01) | |
| *B05D 5/00* | (2006.01) | |
| *B05D 7/24* | (2006.01) | |
| *B01D 53/02* | (2006.01) | |
| *B82Y 30/00* | (2011.01) | |
| *B82Y 40/00* | (2011.01) | |

(52) U.S. Cl.
CPC ............ *B01D 53/0407* (2013.01); *B01D 53/02* (2013.01); *B01D 53/04* (2013.01); *B01D 53/82* (2013.01); *B01D 53/86* (2013.01); *B01D 53/92* (2013.01); *B01D 53/94* (2013.01); *B05D 1/02* (2013.01); *B05D 3/02* (2013.01); *B05D 5/00* (2013.01); *B05D 7/24* (2013.01); *C01B 31/0226* (2013.01); *C01B 31/0253* (2013.01); *C01B 31/0273* (2013.01); *B01D 2253/102* (2013.01); *B01D 2253/304* (2013.01); *B01D 2253/342* (2013.01); *B01D 2255/1023* (2013.01); *B01D 2255/1025* (2013.01); *B05D 2203/30* (2013.01); *B05D 2254/02* (2013.01); *B05D 2254/04* (2013.01); *B05D 2254/06* (2013.01); *B05D 2518/00* (2013.01); *B82Y 30/00* (2013.01); *B82Y 40/00* (2013.01)

(58) Field of Classification Search
None
See application file for complete search history.

(56) References Cited

U.S. PATENT DOCUMENTS 7,074,260 B2 * 7/2006 Lee .................... B01J 19/088
                                                        55/527

OTHER PUBLICATIONS

Giordano et al., "Preparation of Rhodium Catalysts Supported on Carbon Nanotubes by a Surface Meidated Organometallic Reaction," Eur. J. Inorg. Chem. 2203, 610-617.*
Karousis et al., "Carbon Nanotubes Decorated with Palladium Nanoparticles: Synthesis, Characterization, and Catalytic Activity," J. Phys. Chem. C 2008, 112, 13463-13469.*

* cited by examiner

*Primary Examiner* — William Phillip Fletcher, III
(74) *Attorney, Agent, or Firm* — Barry Choobin; Patent 360

(57) ABSTRACT

The various embodiments herein provide for an intelligent method and system with carbon nano tube filters for adsorbing and removing toxic and hydrocarbons in exhaust and in industrial soot. The carbon nano tube filter comprises two nano catalysts and monolith cylinders. The carbon nano tubes are single or multi walled. The nano catalysts are optimized carbon nano tubes coated with adhesive material, cobalt oxide and nano oxides of specific metals. The monolith cylinders are covered by palladium and rhodium oxides. The process of making the carbon nano tube based filter involves synthesis of highly purified carbon nano tube, surface modification of carbon nano tube with catalyst nano particle and optimization and deposition of nano metal oxides on the surface of nano catalyst. Further the nano-materials are coated on the internal surface of monoliths and the entire structure in subjected to sintering in a vacuum furnace.

4 Claims, 28 Drawing Sheets

CARBON NANO TUBE INTELLIGENT FILTER FOR ADSORPTION OF POLLUTANTS AND HYDROCARBONS IN ENVIRONMENT AND RECOVERY TO EXCELLENT INDUSTRIAL CARBON

BACKGROUND

1. Technical Field

The embodiments herein generally relate to the field of pollution control and green technology. The embodiments herein particularly relate to air pollution control using carbon nano structures. The embodiments herein more particularly relate to a smart intelligent filter with carbon nano tubes for adsorption of toxic and hydrocarbons such as hazardous pollutant gases like $H_2S$, $NH_3$ compositions emitted from motor vehicles and industries urban buses and diesel cars also $NO_x$, $SO_x$, CO, $CO_2$ etc. The embodiments herein also relate to a recycling of the pollutants and converting them into premium is industrial soot.

2. Description of the Related Art

Pollution is an introduction of contaminants or pollutants into the natural environment that causes an adverse change. The pollutants or contaminants are can be either foreign substances/energies or naturally occurring substances. Broadly the pollution is classified as atmospheric pollution, water pollution, and soil pollution. Few other types of pollution are noise pollution, space pollution, etc.

The pollution can broadly lead to a destruction of an environment, ecological cycles, and lead to the health problems in a habitat or community. The pollution has lead to the environmental crises such as global warming, biomagnification, smog, acid rain, a rise in the sea level and melting of ice sheets thereby depletion of polar ice caps. The health issues such as asthma, bronchitis, sinusitis and bronchial infection are globally becoming prominent because of the pollution.

The prominent agenda in the entire world is air pollution. The air pollution is defined as an introduction of chemicals, particulates, or biological materials into the atmosphere that cause a discomfort, a disease, or a death to the humans, a damage to other living organisms such as food crops, or a damage to the natural environment. The gases such $CO_2$, CO, $CH_4$, $NH_2$, $NH_3$, $NO_x$, $O_3$ etc., are known as green house gases. The green house gases pose a threat towards the global warming and prominent respiratory health hazards. The greenhouse gases are released into the atmosphere by automobiles (cars, two wheelers etc), industry, combustion of fossil fuels etc. The automobile emissions are produced due to the petroleum based, fuels. The ideal combustion of hydrocarbons generates water and carbon dioxide. Further, due to an increase in the temperature of the combustion chamber and lack of control on the combustion process, the exhaust emissions of the automobiles have many harmful pollutants. The emissions produced by the cars consist of complex compounds whose structure depends on various factors such as engine type (reciprocating or two-stroke engine, four stroke engine, diesel engine and gasoline engine) and also the driving conditions (driving within the city and out of the city, increasing and decreasing and decreasing the acceleration). The emissions produced by the automobiles especially cars comprise three common types of pollutants including but not limited to unburned hydrocarbons, half-burnt hydrocarbons, carbon monoxide and nitrous oxide. There are some other compositions besides these gases in the pollutants of car emissions such as water, hydrogen, nitrogen and oxygen. The car emissions also include sulfur dioxide which cannot be removed by the catalytic converters. Among all, the reduction of sulfur is the major method applied to confront with it as a pollutant.

The human race must take the measures to tackle the problem of pollution especially the emissions generated from the automobiles. Many measures have been taken to counter the pollution globally, many treaties, communities and authoritative bodies have been made to monitor and regulate pollution worldwide. Several measures have been taken to control the air pollution such as use of the low sulfur fuel instead of high sulfur fuel. But the problem of engine knocking comes into picture when the fuel is not mixed with sulfur or lead.

According to a prior art, the other methods for countering the pollution are the use of ethanol mixed fuel or natural gas as fuel. But the cost involved in the preparation of the ethanol or the extraction of the natural gas makes the cost high. Secondly, the fermentation for ethanol preparation and extraction of natural gas poses other environmental threats such as destruction of natural habitat and deforestation. Further the natural gas as a fuel emits the methane and the carbon dioxide in atmosphere, which are prominent greenhouse gases.

According to a prior art, the other measures such as control and treatment of volatile organic compounds (VOC) and organic hazardous air pollutant emissions are generally accomplished by adsorption, incineration, condensation and gas absorption. But not much is done in the area of the is treatment of the pollutants by adsorption, incineration, condensation and gas adsorption.

According to one prior art, the other method for reduction of pollutant emission from a vehicle exhaust particularly car emission is the use of a catalyst. The technology of catalytic converter is constantly developing to correspond to the recent environmental regulations. Further the catalytic converters must be developed for the reduction of pollutant emissions in cars with an increased lifespan of five years or 100000 kilometers. But such kind of catalytic converters are yet to be developed.

According to one prior art, the combination of nanotechnology with the catalytic converter preparation is the new field of technology in the area of pollutant emission control. The catalytic converters made with the help of nanotechnology are most helpful or efficient in absorbing, analyzing and recycling the high percentage of hydrocarbon pollutants. The recent technologies of filtration and catalyst are solely capable of absorbing only 60 percent of hydrocarbon pollution and convert the hydrocarbon into water through the use of expensive catalyst converter.

According to one prior art, the automobile emissions especially the car emissions mainly comprises sulfur dioxide which is not removed by the catalytic converters. The reduction of sulfur amount is the major factor required for a pollution control. The catalytic converters comprise mainly compounds based on the nature of the automobile emission for reducing and oxidizing the toxic compounds and hydrocarbons. The use of oxidizing compounds in the catalytic converters leads to an oxidation of the monoxide carbon and carbon dioxide. The use of reducing compounds in the catalytic converters leads to a reduction of the carbon dioxide and nitrous oxide. The oxidation and reduction reactions lead to a production of ammonia, unburnt hydrocarbons and aldehydes. The ammonia, unburnt hydrocarbon and aldehydes lead to the breathing difficulties in a long term in a human body and also diseases such as multiple sclerosis that are caused by toxic and dangerous effects of these chemical factors.

According to one prior art, the existing photo catalysts used for pollution control in the automobiles exhibit high speed of saturation and the efficient controlling capacity is maintained only for two months.

Hence there is a need to develop a nanotechnology based carbon nano tube filter which is efficient, exhibits low speed of saturation, high level of adsorption, and 97% capacity of absorption in pollutant control. Further there is a need for the carbon nano tube filters to act against all types of the corresponding emissions from the automobile (car). Yet there is a need for a carbon nano tube filter to oxidize and reduce the emissions of car to simpler, non harmful and degradable compounds. Yet there is a need for a carbon nano tube filter to efficiently control pollutant emission for a longer period of at least 9 months. Yet there is a need for a carbon nano tube filter to control and analyze the pollutants. Yet there is a need for a carbon nano tube filter that is synthesized and optimized to have a preset size for removing the pollutants and recycling them in industrial soot.

The above mentioned shortcomings, disadvantages and problems are addressed herein and which will be understood by reading and studying the following specification.

OBJECTIVES OF THE EMBODIMENTS

The primary object of the embodiments herein is to provide a simple and effective carbon nano tube filters for adsorption of hydrocarbon emission and toxic pollutants.

Another object of the embodiments herein is to provide carbon nano tube filters for recycling the pollutants in a premium industrial soot.

Yet another object of the embodiments herein is to provide carbon nano tube filters for pure air emission and pollutant free air after absorption of the pollutants.

Yet another object of the embodiment herein is to provide carbon nano tube filters with a low speed of saturation.

Yet another object of the embodiment herein is to provide carbon nano tube filters which exhibit a high level of adhesion strength and adsorption.

Yet another object of the embodiment herein is to provide carbon nano tube filters with a capacity of 97% for an adsorption and controlling of pollutants.

Yet another object of the embodiments herein is to provide carbon nano tube filters for absorption and control of hydrocarbon emission of urban buses.

Yet another object of the embodiments herein is to provide carbon nano tube filters with high absorption level of toxic material and the filters have intelligent control system.

Yet another object of the embodiments herein is to provide carbon nano tube filters having chemical interaction between nanostructures and toxic hydrocarbon materials after absorption.

Yet another object of the embodiment herein is to provide carbon nano tube filters with efficiency for controlling pollution for a period of 9 months.

Yet another object of the embodiments herein is to provide carbon nano tube filters which analyze the carbon dioxide and oxygen.

Yet another object of the embodiments herein is to synthesize the absorbent carbon nano tube filters with dimensions of 2 inches in diameter and 20 centimeters in length.

Yet another object of the embodiments herein is to provide carbon nano tube filters which lead to reduction in air pollution in metropolitan cities.

These and other objects and advantages of the embodiments herein will become readily apparent from the following detailed description taken in conjunction with the accompanying drawings.

SUMMARY

The various embodiments herein provide an intelligent filter system with nano filters comprising carbon nanotubes for the toxic and hydrocarbon contaminants in an environment and a method of fabricating the same. According to an embodiment herein, a method of manufacturing a carbon nano filter system for removing the toxic pollutants and hydrocarbons is provided for automobile vehicles and industrial soot. The method comprises the steps of synthesizing and purifying a carbon nanotube and wherein the carbon nanotube is a single walled tube and wherein the carbon nanotube is a multi walled tube. Then a surface modification of carbon of the carbon nanotubes and a catalyst nano particle is performed. The nano catalytic metal particles are optimized. A plurality of non-metallic sensors are grown on the carbon nano tubes to act as smart sensors and devices. A surface of carbon nano tubes is enhanced and pretreated by adding metal-metal oxides of nano particles. The nano particles of metal oxides depositing on a surface of a nano catalyst are optimized. A surface of carbon, nano tubes is fabricated with carbon nano fibers and nano metal oxides for isolating the nano structures. A surface area coefficient is incremented by creating a specific nano electronic platform and the nano materials are coated on an internal surface of monolithic structure and sintered in a vacuum furnace.

According to an embodiment herein, the carbon nano tube is synthesized and purified by performing a surface treatment of the carbon nano tube with palladium and rhodium. A binder is added to the carbon nano tube and wherein the binder is a resin and wherein the resin is a phenolic resin with a commercial name of IL 800. A metal to metal oxide particles is attached to the surface of the carbon nanotube and wherein the metal to metal oxide particles includes cobalt oxide, palladium and molybdenum and wherein the cobalt oxide is cobalt nitrate and the molybdenum is hepta molybdenum ammonium. A metal oxide particle is sprayed on the surface of carbon nano tube and wherein the metal oxide particles include oxides of palladium and rhodium.

According to an embodiment herein, the cobalt oxide is added at a weight percentage of 2.6031 and the molybdenum is added at a weight percentage of 3.63.

According to an embodiment herein, the carbon nanotubes are calcinated at a vacuum furnace at 300° C. for 4 hours.

According to an embodiment herein, a carbon nano filter system for removing toxic and hydrocarbon pollutants in environment is provided. The system comprises an external casing. The external casing has a single tube housing a plurality of conversion devices. A filter mesh unit is installed in the external housing. The filter mesh unit comprises a plurality of nano catalysts and a monolith cylinder. The plurality of nano catalysts are an optimized nanotubes coated with adhesive materials and a metal to metal oxide particles and a nano oxides of active metals.

According to an embodiment herein, the naotubes are a single walled carbon nanotubes. According to an embodiment herein, the naotubes are a multi walled carbon nanotubes.

According to an embodiment herein, the carbon nano tubes are coated with oxides of palladium and rhodium.

According to an embodiment herein, the metal to metal oxide particles include cobalt oxide, palladium and molybdenum and the cobalt oxide cobalt nitrate and the molybdenum is hepta molybdenum ammonium. The cobalt oxide is added at a weight percentage of 2.6031. The molybdenum is added at a weight percentage of 3.63.

According to an embodiment herein, the oxides of specific materials are oxides of palladium and rhodium.

According to an embodiment herein, the monolith cylinders are multiwall carbon nanotubes mixed with resin binders and sprayed with oxides of palladium and rhodium, and wherein the resin is phenolic resin.

According to an embodiment herein, an intelligent filter system for hydrocarbon and toxic pollutants in environment is provided. The filter system comprises a nano filter, a plurality of nano sensors, an electrical power supply, and a processor. The processor adjusts an electrical power applied to the nano filters based on an output of nano sensors to output an active industrial oxygen and carbon. The power supply is a high frequency circuit.

According to an embodiment herein, the nano filter comprises a plurality of carbon nano tubes housed inside a plurality of monolithic cylinders arranged inside a metal casing provided with a plurality of fins.

According to an embodiment herein, the plurality of nano tubes are single walled carbon tubes or multi walled carbon nano tubes.

According to an embodiment herein, the carbon nano tubes are purified and mixed with resin binder and coated with metal to metal oxide particles and oxides of specific materials.

According to an embodiment herein, wherein the metal to metal oxide particles includes cobalt oxide, palladium and molybdenum. The cobalt oxide is cobalt nitrate and the molybdenum is hepta molybdenum ammonium.

According to an embodiment herein, the oxides of specific materials are oxides of palladium and rhodium.

The various embodiments herein provide a new innovative method for controlling the air pollution by carbon nano tube filters. The air pollution is defined as the introduction of chemicals, particulates, or biological materials into the atmosphere that cause discomfort, disease, or death to humans, damage to other living organisms such as food crops, or damage to the natural environment. The gases such $CO_2$, CO, $CH_4$, $NH_2$, $NH_3$, $NO_x$, $O_3$ etc., are known as green house gases. The green house gases pose a threat towards global warming and prominent respiratory health hazards. The greenhouse gases are released into the atmosphere by automobiles (cars, two wheelers etc), industry, combustion of fossil fuels etc. The automobile emissions are produced due to the petroleum, based fuels. The nanotechnology based carbon nano tube filters are new generation devices for pollution control which adsorb the harmful emissions of the automobiles.

According to one embodiment herein, the carbon nano tube filter comprises of a first nano catalyst (optimized carbon tubes+adhesive material+cobalt oxide and nano oxides of specific metals), a second nano catalyst (optimized carbon, tubes+adhesive materials+cobalt oxide and nano oxides of specific metals and monolith cylinders covered by palladium and rhodium oxides.

According to one embodiment herein the carbon nano tube filter comprises of two parts i.e. external and internal. The external part, do not have any influence on the activities of adsorbent tube, and the external part is designed for pollution test, protection of adsorbent tube against impact and also integration of the structure. The external part is made up of a four inches tube, four flanges and two conversion devices of 3-4 pieces which are built upon stainless steel. These components protect the adsorbent tube after welding. The internal part comprises 3 monolith tubes. Each monolith tube is of 9 centimeter in diameter and 17 centimeter in length with a reticular structure. Further the solutions of palladium and rhodium are sprayed on the monolith tubes and then the monolith tubes are placed in the teklis or calcination furnace. The other 2 monolith tubes are multi walled carbon nano tube structures including adhesive material and metals such as cobalt and molybdenum.

According to one embodiment herein, the optimization of the carbon nano tube filter and designing of a carbon nano tube filter is performed based on the technology of adsorption and analysis of hydrocarbon pollutants of diesel, cars, due to the fact that nano tube create a great contact surface. The surface adhesion through optimization and combination with nano-oxide elements having high nanometric scale (under 10 nm). The dimension of synthesized adsorbent carbon nano tubes are 2 inches in diameter and 20 cm in length and a comparative analysis of the nano tubes is carried out with methods such as TEM, SEM and XRD.

According to one embodiment herein, for the construction of nano catalyst, an insemination method is used. The method involves forming active metals such as cobalt and molybdenum on the carbon nano tube base. The insemination method is well known as one of the commercial approaches in the construction of catalysts. In the insemination method, a desired metal combinations containing cobalt or molybdenum are selected and situated on the support of the nano tube. These combinations which are called substrate generally are metal salt (inorganic salt) solitude in aqueous phase. A cobalt nitrate is applied to heptamolybdate ammonium as a substrate containing molybdenum. The cobalt nitrate, molybdenum, and heptamolybdate ammonium salts are dissolved in a distilled water through/by using heat, and then nano tubes are entered/immersed in the produced solution. The solution is allowed to penetrate into the cavities and surface of carbon nano tubes, and it is thoroughly adsorbed. The next step comprises of drying the treated carbon nano tubes in the temperature of 120° C. and then the next step is followed by calcification. There are many influencing factors for the insemination method such as type of substrate, order of combination of metals and condition of calcinations.

According to one embodiment herein, the next step in the production of first nano catalyst is in subjecting the first nano catalyst to resin phenolic with the brand of IL 800, which has been used as a binder for connecting and shaping carbon nano tubes. The above mentioned resin is a product of Rezita Company. The inner part of the monolith cylinder is covered 10 by 200 grams of resin and 2 grams of carbon multi-walled carbon nano tube. For mixing a carbon nanotube and resin phenolic properly, a mechanical mixer is used for half an hour. After entering resin and carbon nanotube to the cavities of monolith cylinder, the above mentioned complex is entered into a calcinations or vacuum furnace. The temperature of the furnace is increased up to 300° C. more than room temperature, and it is maintained for 4 hours in this temperature. The cylinders are removed from the furnace, after the temperature of the furnace is gradually decreased to the room temperature. After this stage, the resin is destroyed and the resin is surrounded by the carbon nano tubes like a carbon chain. Then a solution containing 5.2 grams of ammonium heptamolybdate and 4.3 grams of cobalt nitrate in 47.4 grams of distilled water is prepared and the solution is sprayed to the cavities of the cylinder produced in the previous phase. As the insemination is completed, a calcination operation is done in the furnace.

For calcination, the temperature of furnace is increased up to 300° C. more than temperature of environment and is kept in this temperature for 4 hours.

According to one embodiment herein, after the synthesis of the carbon nano filters, the investigation is carried out for the influence of the intelligent catalyst nano filters on the amount of pollutants. As the nano filter is constructed and is installed in the metal holder pipe, the influence of the catalyst nano filter on the emissions of a mega trans is evaluated (production of Iran khodrodizel, belonging to the bus fleet). The amount of soot is measured by AVL system, and other pollutants (carbon monoxide, carbon dioxide, nitrogen monoxide, nitrogen dioxide, sulfur dioxide and sulfide hydrogen) are measured by MRU VARIOPLUS 294 372 system. The amounts of pollutants are measured by Air Quality Control Company. The influence of nano catalytic converter is evaluated one hour later after the installation of the carbon nano filters on the exhaust. The percentage of the pollutant is found to be decreased after the installation of the catalyst converter. As an example, the amount of the soot emissions is decreased by 99.1%.

According to one embodiment herein, after an installation of the catalyst converters, the average percentage decrease in the amount of emissions is 20%. In an adsorbent second nano filter, the nano catalysts exhibit considerable activity in decreasing the amount of pollutants such as carbon dioxide and carbon monoxide.

According to one embodiment herein, the next step is the determination of the specifications for the nano catalysts and multi-walled carbon nano tubes as supports. In this part, the specifications of nano catalysts and multi-walled carbon nano tubes as supports are determined. The ICP-OES method (model of VISTA-PRO, production of Warian Company, made in Australia) is used for determining the percentage of metal combinations of cobalt and molybdenum. For the identification of the appearance/shape and structural form, a scanning electron microscope (VEGA-TESCAN model) is used. For the identification of the structural form and the placement mode of metal particles on the support, the transition electron microscope is used. For defining the type of various constructed combinations in nano catalyst and crystal structure, the method of XRD (X'PertMPD model, production of Philips Company, made in Holland) is used. In the case of multi-walled carbon nano tubes, an imaging is done by using a transition electron microscope and a scanning microscope. The results of the imaging by the scanning electron microscope illustrate that the superficial structure of carbon nano tubes are not changed after the calcination and a placement of the active metals, and metal components are surrounded by the carbon nano tubes. In the case of spectrums obtained from nano catalyst with multi walled carbon nanotubes as support, similar structures are identified. The multi-walled carbon nano tubes act as support for carbon, $Mo_2C$ and cobalt in nano catalyst.

According to one embodiment herein the size of the crystals is calculated by Sherrer equation.

$$L = \frac{K \cdot \lambda}{B_m \cos\theta}$$

In the above equation, L stands for the size of crystal in terms of angstrom unit, K is the constant value of the Sherrer equation, $B_m$ is the width of the pick in radians, λ is x-ray wavelength; θ is the angle for forming the pick.

These and other aspects of the embodiments herein will be better appreciated and understood when considered in conjunction with the following description and the accompanying drawings. It should be understood, however, that the following descriptions, while indicating preferred embodiments and numerous specific details thereof are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
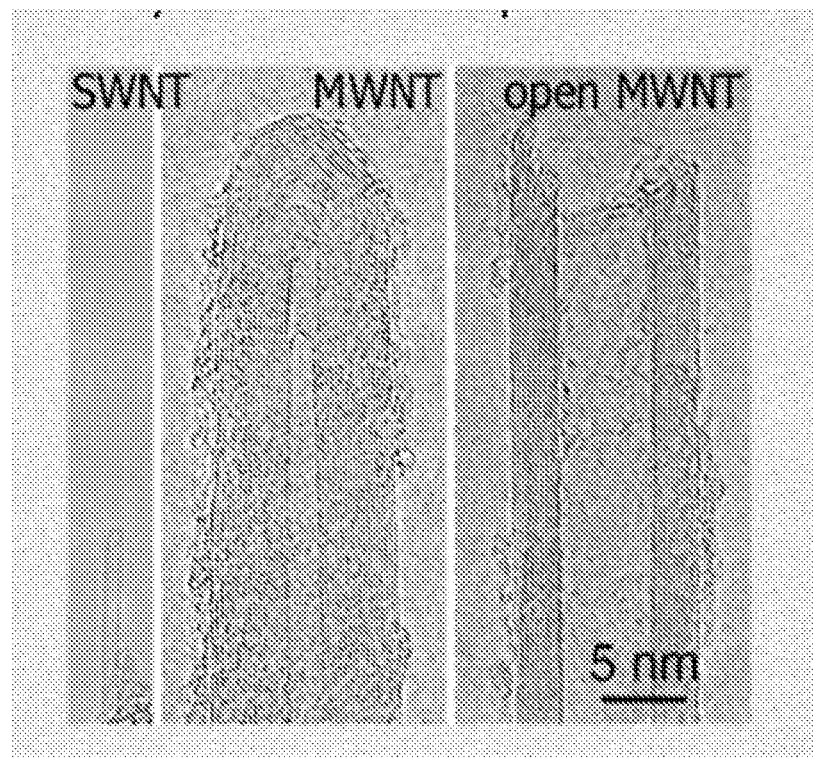
FIG. 1 shows a schematic view illustrating a structure of single walled nano tubes (SWNTs) and multi-walled nano tubes (MWNTs), according to the embodiments herein.

These and other aspects of the embodiments herein will be better appreciated and understood when considered in conjunction with the following description and the accompanying drawings. It should be understood, however, that the following descriptions, while indicating preferred embodiments and numerous specific details thereof are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an intelligent filter system with nano filters comprising carbon nanotubes for the toxic and hydrocarbon contaminants in an environment and a method of fabricating the same. According to an embodiment herein, a method of manufacturing carbon nano filter system for removing the toxic pollutants and hydrocarbons is provided for automobile vehicles and industrial soot. The method comprises the steps of synthesizing and purifying a carbon nanotube and wherein the carbon nanotube is a single walled tube and wherein the carbon nanotube is a multi walled tube. Then a surface modification of carbon of the carbon nanotubes and a catalyst nano particle is performed. The nano catalytic metal particles are optimized. A plurality of non-metallic sensors are grown on the carbon nano tubes to act as smart sensors and devices. A surface of carbon nano tubes is enhanced and pretreated by adding a metal-metal oxide of nano particles. The nano particles of metal oxides depositing on a surface of a nano catalyst are optimized. A surface of carbon nano tubes is fabricated with carbon nano fibers and nano metal oxides for isolating the nano structures. A surface area coefficient is incremented by creating a specific nano electronic platform and the nano materials are coated on an internal surface of monolithic structure and sintered in a vacuum furnace.

According to an embodiment herein, the carbon nano tube is synthesized and purified by performing a surface treatment of the carbon nano tube with palladium and rhodium. A binder is added to the carbon nano tube and wherein the binder is a resin and wherein the resin is a phenolic resin with a commercial name of IL 800. A metal to metal oxide particles is attached to the surface of the carbon nanotube and wherein the metal to metal oxide particles includes cobalt oxide, palladium and molybdenum and wherein the cobalt oxide is cobalt nitrate and the molybdenum is hepta molybdenum ammonium. A metal oxide particle is sprayed on the surface of carbon nano tube and wherein the metal oxide particles include oxides of palladium and rhodium.

According to an embodiment herein, the cobalt oxide is added at a weight percentage of 2.6031 and the molybdenum is added at a weight percentage of 3.63.

According to an embodiment herein, the carbon nanotubes are calcinated at a vacuum furnace at 300° C. for 4 hours.

According to an embodiment herein a carbon nano filter system for removing the toxic and hydrocarbon pollutants in environment is provided. The system comprises an external casing. The external casing has a single tube housing a plurality of conversion devices. A filter mesh unit is installed in the external housing. The filter mesh unit comprises a plurality of nano catalysts and a monolith cylinder. The plurality of nano catalysts are an optimized nanotubes coated with adhesive materials and a metal to metal oxide particles and a nano oxides of active metals.

According to an embodiment herein, the naotubes are single walled carbon nanotubes. According to an embodiment herein, the naotubes are a multi walled carbon nanotubes.

According to an embodiment herein, the carbon nano tubes are coated with the oxides of palladium and rhodium.

According to an embodiment herein, the metal to metal oxide particles include cobalt oxide, palladium and molybdenum and the cobalt oxide is cobalt nitrate and the molybdenum is hepta molybdenum ammonium. The cobalt oxide is added at a weight percentage of 2.6031. The molybdenum is added at a weight percentage of 3.63.

According to an embodiment herein, the oxides of specific materials are oxides of palladium and rhodium.

According to an embodiment herein, the monolith cylinders are multiwall carbon nanotubes mixed with resin binders and sprayed with oxides of palladium and rhodium, and wherein the resin is phenolic resin.

According to an embodiment herein, an intelligent filter system for hydrocarbon and toxic pollutants in environment is provided. The filter system comprises a nano filter, a plurality of nano sensors, an electrical power supply, and a processor. The processor adjusts an electrical power applied to the nano filters based on an output of nano sensors to output an active industrial oxygen and carbon. The power supply is a high frequency circuit.

According to an embodiment herein, the nano filter comprises a plurality of carbon nano tubes housed inside a plurality of monolithic cylinders arranged inside a metal casing provided with a plurality of fins.

According to an embodiment herein, the plurality of nano tubes are single walled carbon tubes or multi walled carbon nano tubes.

According to an embodiment herein, the carbon nanotubes are purified and mixed with resin binder and coated with metal to metal oxide particles and oxides of specific materials.

According to an embodiment herein, wherein the metal to metal oxide particles include cobalt oxide, palladium and molybdenum. The cobalt oxide is cobalt nitrate and the molybdenum is hepta molybdenum ammonium.

According to an embodiment herein, the oxides of specific materials are oxides of palladium and rhodium.

The various embodiments herein provide a new innovative method for controlling the air pollution by the carbon nano tube filters. The air pollution is defined as the introduction of chemicals, particulates, or biological materials into the atmosphere that cause discomfort, disease, or death to humans, damage to other living organisms such as food crops, or damage to the natural environment. The gases such $CO_2$, CO, $CH_4$, $NH_2$, $NH_3$, $NO_x$, $O_3$ etc., are known as green house gases. The green house gases pose a threat towards global warming and prominent respiratory health hazards. The greenhouse gases are released into the atmosphere by automobiles (cars, two wheelers etc), industry, combustion of fossil fuels etc. The automobile emissions are produced due to the petroleum based fuels. The nanotechnology based carbon nano tube filters are new generation devices for pollution control which adsorb the harmful emissions of the automobiles.

According to one embodiment herein, the carbon nano tube filter comprises a first nano catalyst (optimized carbon tubes+ adhesive material+cobalt oxide and nano oxides of specific metals), a second nano catalyst (optimized carbon tubes+ adhesive materials+cobalt oxide and nano oxides of specific metals and monolith cylinders covered by palladium and rhodium oxides.

According to one embodiment herein the carbon nano tube filter comprises two parts i.e. external and internal. The external part, do not have any influence on the activities of adsorbent tube, and the external part is designed for pollution test, a protection of the adsorbent tube against impact and also integration of the structure. The external part is made up of a four inches tube, four flanges and two conversion devices of 3-4 pieces which are built upon stainless steel. These components protect the adsorbent tube after welding. The internal part comprises 3 monolith tubes. Each monolith tube is of 9 centimeter in diameter and 17 centimeter in length with a reticular structure. Further the solutions of palladium and rhodium are sprayed on the monolith tubes and then the monolith tubes are placed in the teklis or calcination furnace. The other 2 monolith tubes are multi walled carbon nano tube structures including adhesive material and metals such as cobalt and molybdenum.

According to one embodiment herein, the optimization of the carbon nano tube filter and designing of a carbon nano tube filter is performed based on the technology of adsorption and analysis of hydrocarbon pollutants of diesel cars, due to the fact that nano tubes create a great contact surface. The surface adhesion through optimization and combination with nano-oxide elements having high nanometric scale (under 1.0 nm). The dimension of synthesized adsorbent carbon nano tubes are 2 inches in diameter and 20 cm in length and a comparative analysis of the nano tubes is carried out using methods such as TEM, SEM and XRD.

According to one embodiment herein, for the construction of nano catalyst, an insemination method is used. The method involves forming active metals such as cobalt and molybdenum on the carbon nano tube base. The insemination method is well known as one of the commercial approaches in the construction of catalysts. In the insemination method, the desired metal combinations containing cobalt or molybdenum are selected and situated on the support of the nano tube. These combinations which are called substrate generally are metal salt (inorganic salt) solitude in aqueous phase. A cobalt nitrate is applied to heptamolybdate ammonium as a substrate containing molybdenum. The cobalt nitrate, molybdenum, and heptamolybdate ammonium salts are dissolved in a distilled water through/by using heat, and then nano tubes are entered/immersed in the produced solution. The solution is allowed to penetrate into the cavities and surface of carbon nano tubes, and it is thoroughly adsorbed. The next step comprises of drying the treated carbon nano tubes in the temperature of 120° C. and then the next step is followed by calcification. There are many influencing factors for the insemination method such as type of substrate, order of combination of metals and condition of calcinations.

According to one embodiment herein, the next step in the production of first nano catalyst is in subjecting the first nano catalyst to resin phenolic with the brand of IL 800, which has been used as a binder for connecting and shaping carbon nano tubes. The above mentioned resin is a product of Rezita Company. The inner part of the monolith cylinder is covered by 200 grams of resin and 2 grams of carbon multi-walled carbon nano tubes. For mixing carbon nanotube and resin phenolic properly, a mechanical mixer is used for half an hour. After entering resin and carbon nanotube to the cavities of monolith cylinder, the above mentioned complex is entered into a calcinations or vacuum furnace. The temperature of the furnace is increased up to 300° C. more than room temperature, and it is maintained for 4 hours in this temperature. The cylinders are removed from the furnace, after the temperature of the furnace is gradually decreased to the room temperature. After this stage, the resin is destroyed and the resin is surrounded by the carbon nano tubes like a carbon chain. Then a solution containing 5.2 grams of ammonium heptamolybdate and 4.3 grams of cobalt nitrate in 47.4 grams of distilled water is prepared and the solution is sprayed to the cavities of the cylinder produced in the previous phase. As the insemination is completed, a calcinations operation is done in the furnace. For calcinations, the temperature of furnace is increased up to 300° C. more than temperature of environment and is kept in this temperature for 4 hours.

According to one embodiment herein, after the synthesis of the carbon nano filters, the investigation is carried out for the influence of the intelligent catalyst nano filters on the amount of pollutants. As the nano filter is constructed and is installed in the metal holder pipe, the influence of the catalyst nano filter on the emissions of a mega trans is evaluated (production of Iran Khodrodizel, belonging to the bus fleet). The amount of soot is measured by AVL system, and other pollutants (carbon monoxide, carbon dioxide, nitrogen monoxide, nitrogen dioxide, sulfur dioxide and sulfide hydrogen) are measured by MRU VARIOPLUS 294 372 system. The amounts of pollutants are measured by Air Quality Control Company. The influence of nano catalytic converter is evaluated one hour later after the installation of the carbon nano filters on the exhaust. The percentage of the pollutant is found to be decreased after installation of catalyst converter. As an example, the amount of the soot emissions is decreased by 99.1%.

According to one embodiment herein, after installation of the catalyst converters, the average percentage decrease in the amount of emissions is 20%. In an adsorbent second nano filter, nano catalysts exhibit considerable activity in decreasing the amount of pollutants such as carbon dioxide and carbon monoxide.

According to one embodiment herein, the next step is the determination of the specifications for the nano catalysts and multi-walled carbon nano tubes as supports. In this part, the specifications of the nano catalysts and multi-walled carbon nano tubes as supports are determined. The ICP-OES method (model of VISTA-PRO, production of Warian Company, made in Australia) is used for determining the percentage of metal combinations of cobalt and molybdenum. For an identification of the appearance/shape and structural form, a scanning electron microscope (VEGA-TESCAN model) is used. For the identification of the structural form and the placement mode of metal particles on the support, the transition electron microscope is used. For defining the types of various constructed combinations in nano catalyst and crystal structure, the method of XRD (X'PertMPD model, production of Philips Company, made in Holland) is used. In the case of multi-walled carbon nano tubes, an imaging is done by using a transition electron microscope and a scanning microscope. The results of the imaging by the scanning electron microscope illustrate that the superficial structure of carbon nano tubes are not changed after the calcination and a placement of the active metals, and the metal components are surrounded by the carbon nano tubes. In the case of spectrums obtained from the nano catalyst with multi walled carbon nanotubes as support, similar structures are identified. The multi-walled carbon nano tubes act as support for carbon, $Mo_2C$ and cobalt in nano catalyst.

According to one embodiment herein the size of the crystals is calculated by Sherrer equation.

$$L = \frac{K \cdot \lambda}{B_m \cos\theta}$$

In the above equation, L stands for the size of crystal in terms of angstrom unit, K is the constant value of the Sherrer equation, $B_m$ is the width of is the pick in radians, $\lambda$ is X-ray wavelength; $\theta$ is the angle for forming the pick.

Moreover, the various reaction of purification and conversion of pollutants of are presented as below:

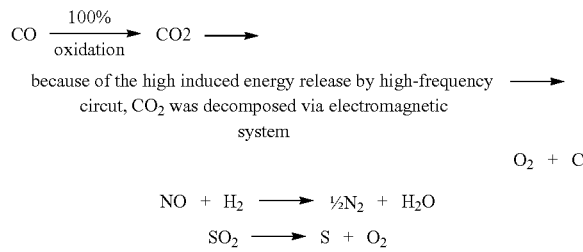

FIG. 1 shows a schematic view illustrating structure of single walled nano tubes (SWNTs) and multi-walled nano tubes (MWNTs), according to the embodiments herein. The carbon nano tubes exist as single walled nano tubes (SWNTs) and multi-walled nano tubes (MWNTs). The carbon nano tubes exhibit structural, mechanical and electrical properties because of the special properties of carbon links, structural nature and cylindrical symmetry. The diameters of nano tubes are not more than few nanometers and their length are about few micrometers similar to those of ideal graphite fibers. The nano tubes are categorized as single-walled nano tubes (SWNTs) and multi-walled nano tubes (MWNTs. The Single-walled nano tubes are graphite cylinders with diameters of 1-4 nanometers. The walls in multi-walled nanotubes are thicker and consist of a few coaxial graphite cylinders which are separated from each other with an approximate distance of 0.34 nanometers. The external diameter of multi walled nano tubes is in the range of 1-8 nanometers. Average length of these nanotubes, varies between some micrometers to centimeters.

Figure 2:
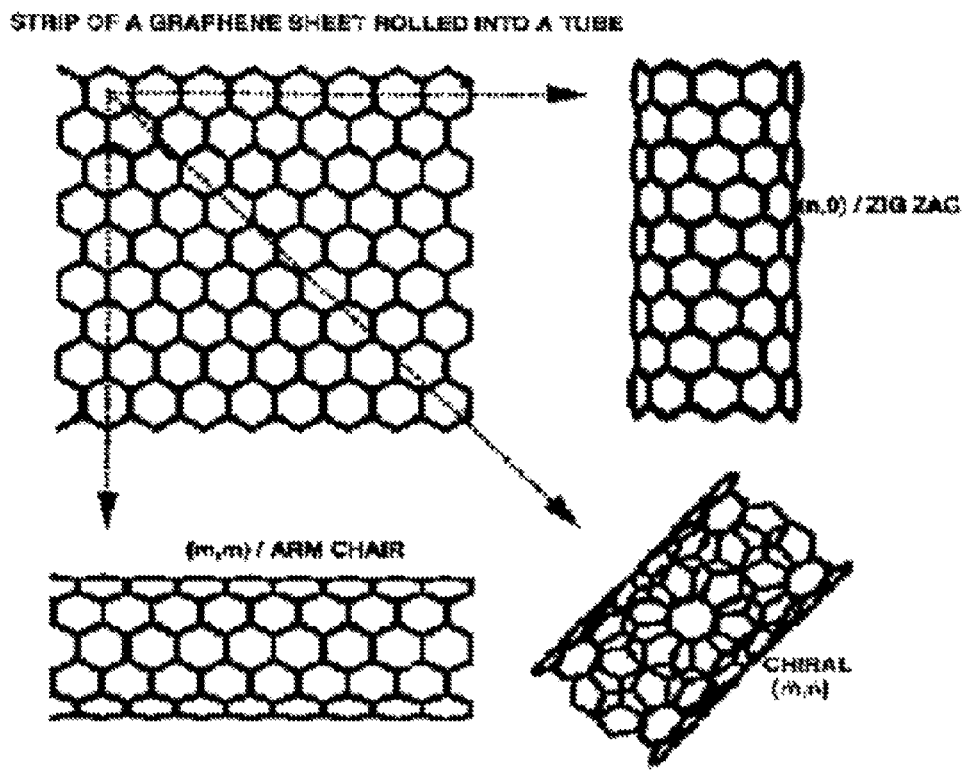
FIG. 2 shows a schematic representation of different types of nano tube structures, according to one embodiment herein.

FIG. 2 shows a schematic representation of different types of nano tube structures, according to one embodiment herein. The nano tubes exhibit three types of structures namely zigzag, armchair, chiral. The chiral is the most common type of structure which is something between arm chair and zigzag structure.

Figure 3:
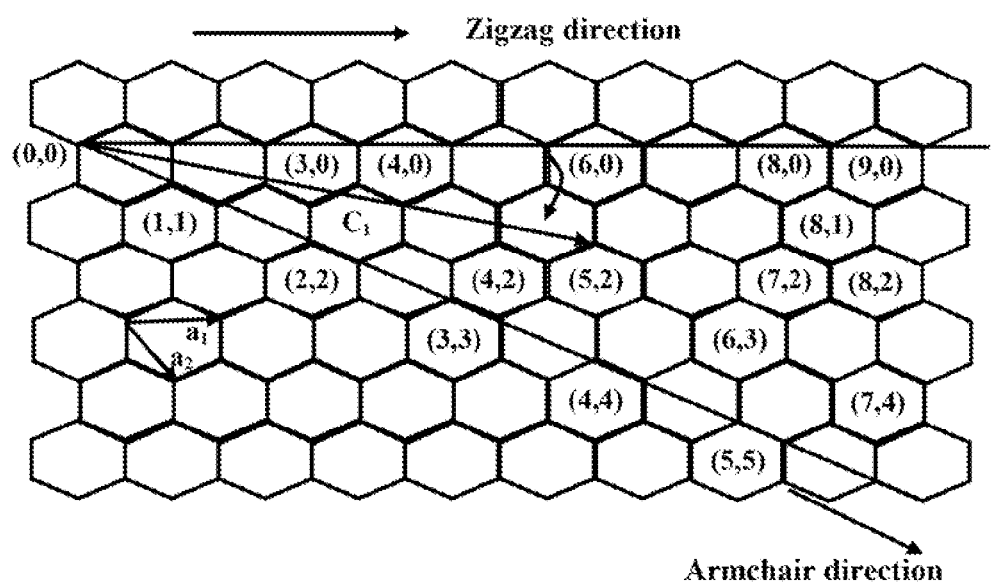
FIG. 3 shows a schematic representation of chiral vector and chiral angle which are used to define the structure of the nano tubes, according to one embodiment herein.

FIG. 3 shows a schematic representation of chiral vector and chiral angle which are used to define the structure of the nano tubes, according to one embodiment herein. The chiral vector and chiral angle are used to define the structure of nanotubes. The chiral vector is represented as $na_1 + ma_2 = C$, wherein $a_1$ and $a_2$ are the vectors of a graphite sheet. 'n' and 'm' are dimensions in length and breadth directions. M and N or 'n' and 'm' are lattice indexes of CNTs that specify the type and properties. If m=O, then the structure will be zigzag, if n=m the structure will be armchair, unless it would be chiral. All of the arm chair nanotubes are made up of metals. One third of chiral and zigzag tubes are metallic conductors and the remaining tubes are semiconductors. If m and n are divisible by 3, the nano tubes act as metallic conductors. Otherwise, one third of the tubes act as semiconductors and the remaining one third act as metallic or metal conductors. The Young's modulus of nano tubes (stress to strain ratio), introduces the resistance of a material against the transformation. This parameter is of 1 Tpa for single-walled nano tube and of 1.28 Tpa for multi walled nano tubes. As the diameter of nano tube is increased, the strain amount is decreased, so that the Young's modulus is increased. The nano tubes show high levels of resistance against chemical attacks and have high level of thermal stability. The transport of electrons is unique in nano tubes, and they are very good conductors along their axis. These materials also act as catalysts, for example, nano tube bases show higher levels of selectivity in heterogeneous catalysts in comparison to activated carbon.

Figure 4:
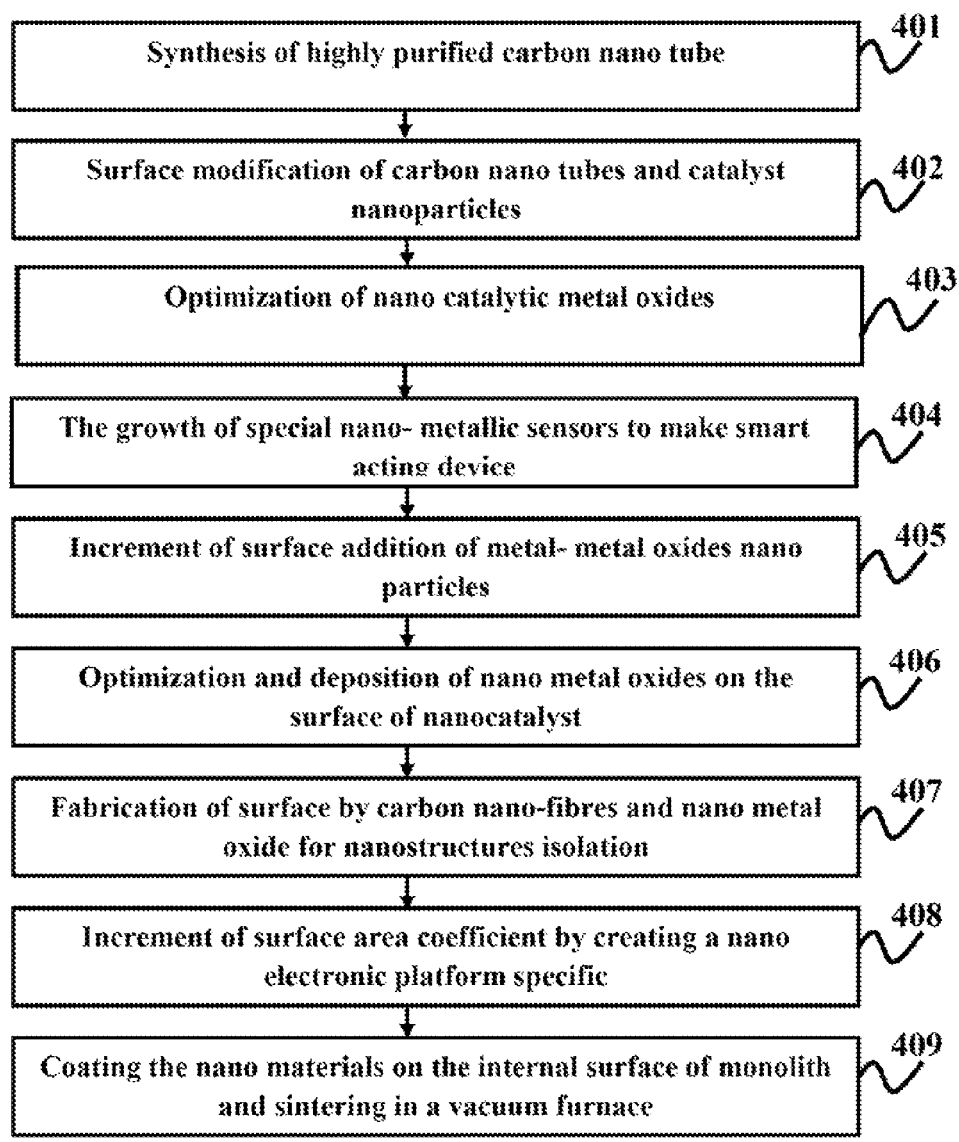
FIG. 4 shows a flow chart illustrating a method of production of the carbon nano tube filter, according to one embodiment herein.
Figure 5A:
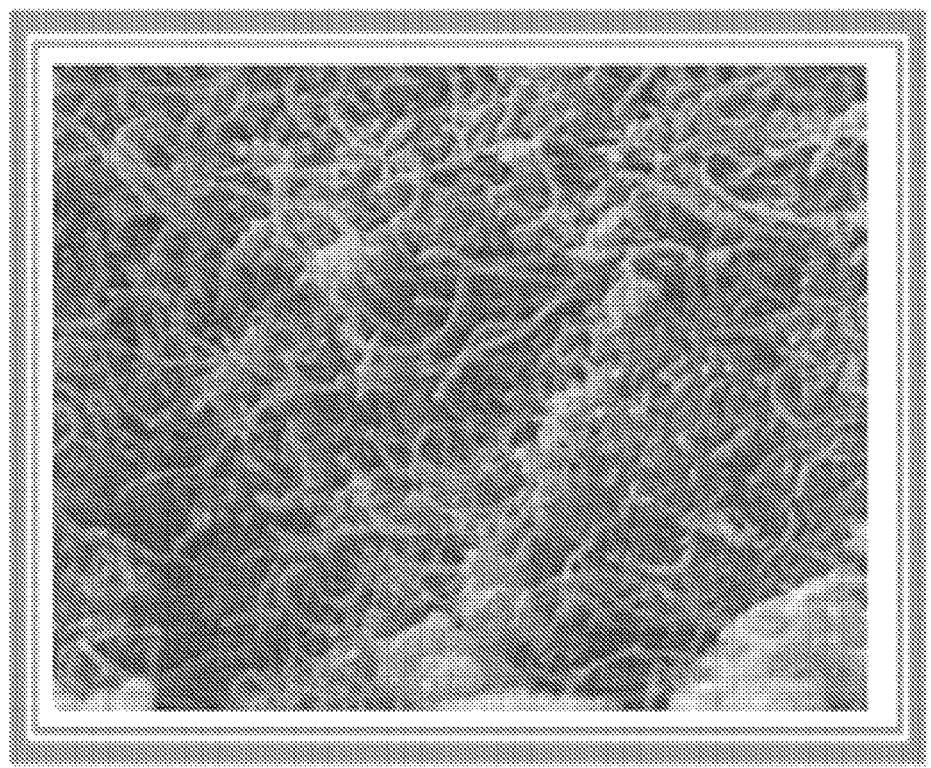
FIG. 5A-FIG. 5D show an internal structure of the carbon nano tube filter and magnified views of a carbon nano tube in the nano filter system, according to one embodiment herein.
Figure 5B:
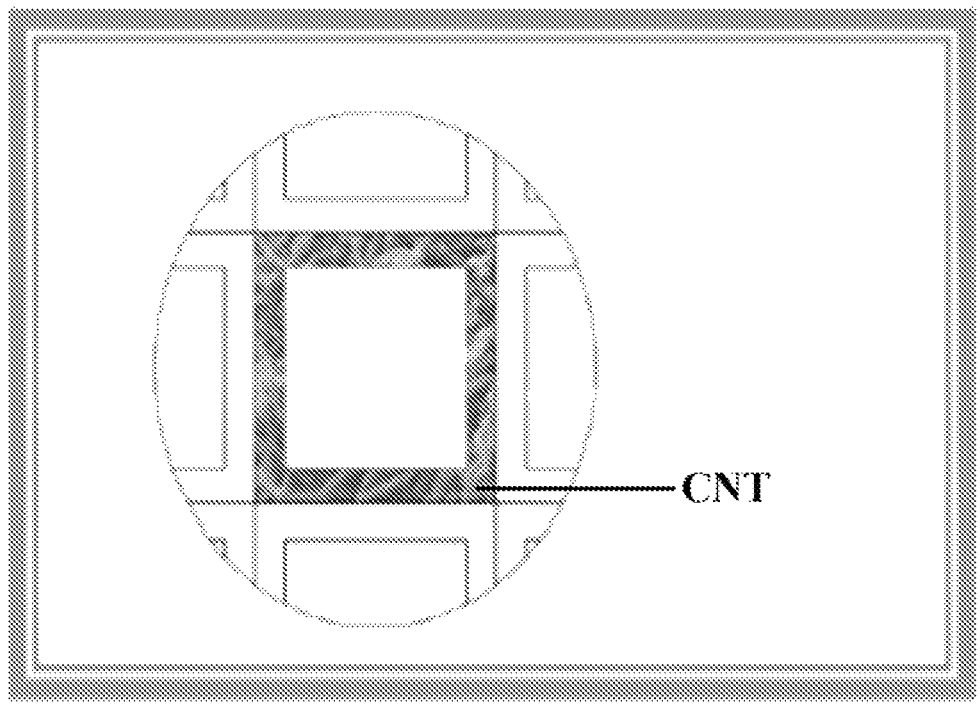
Figure 5C:
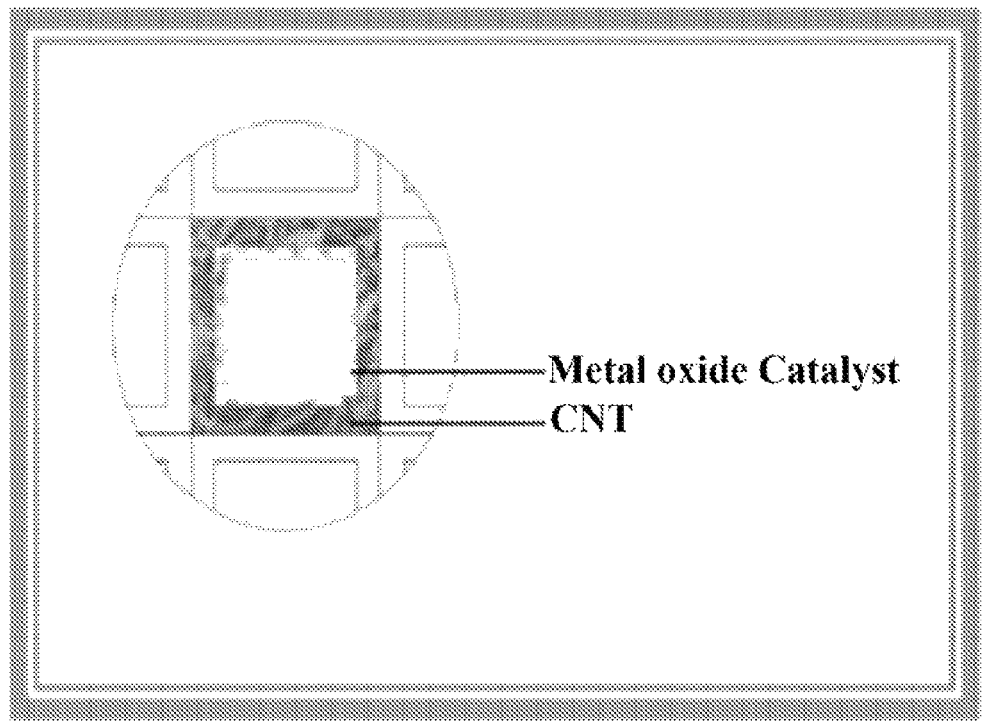
Figure 5D:
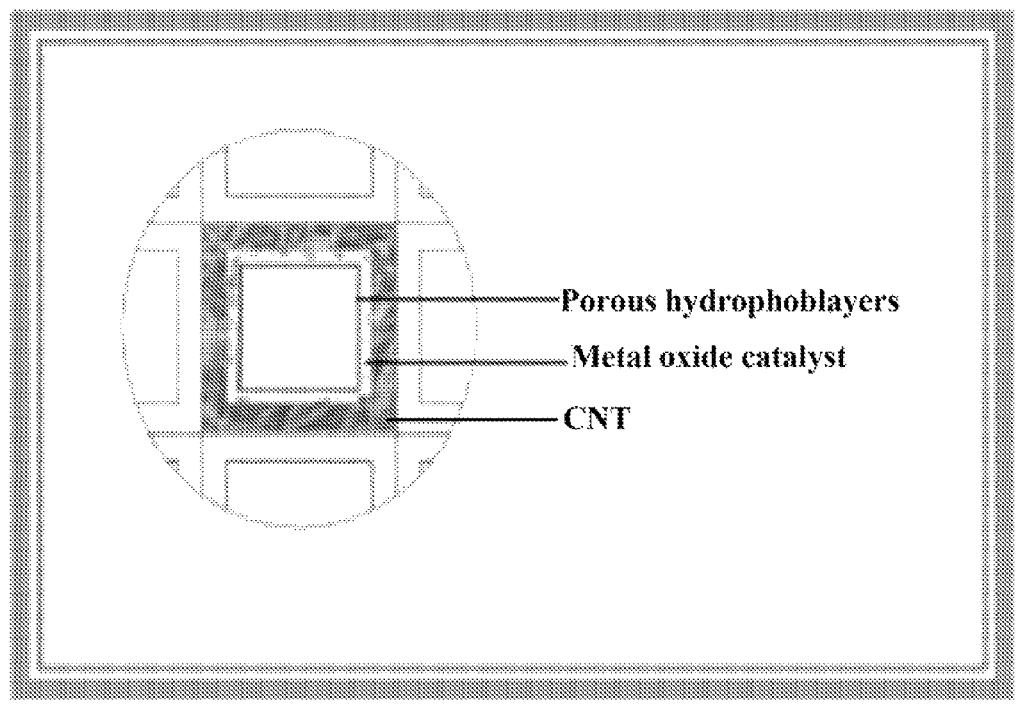
Figure 6A:
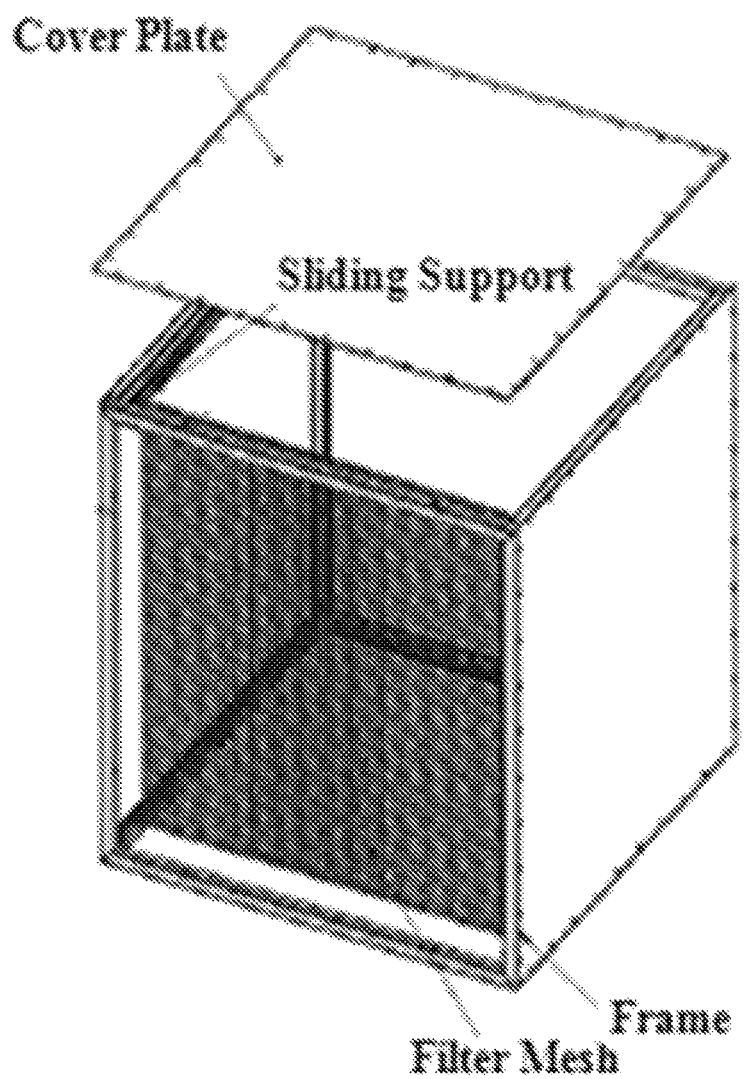
FIG. 6A-FIG. 6D shows a perspective view of carbon nano tube filter system and magnified views of a carbon nano tube in the nano filter system, according to one embodiment herein.
Figure 6B:
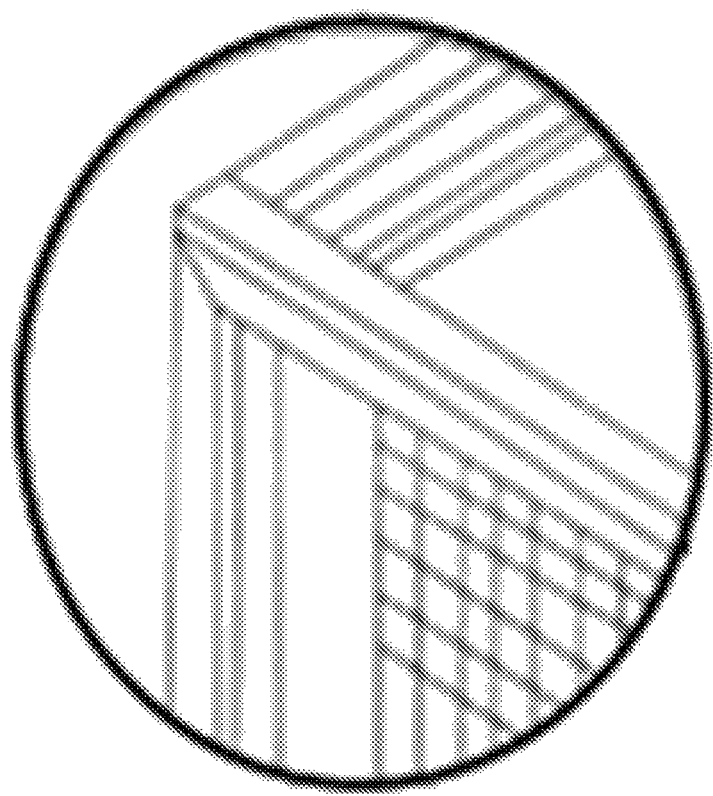
Figure 6C:
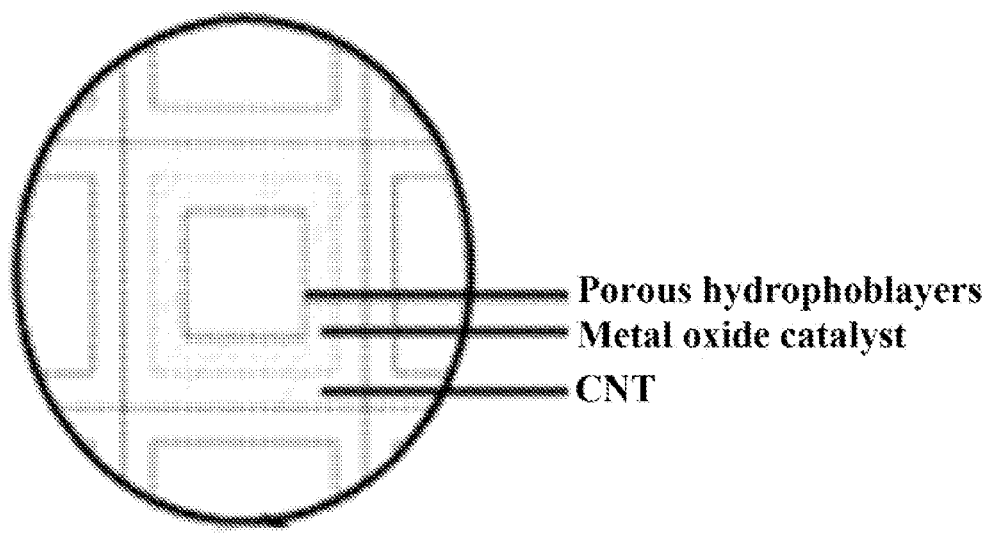
Figure 6D:
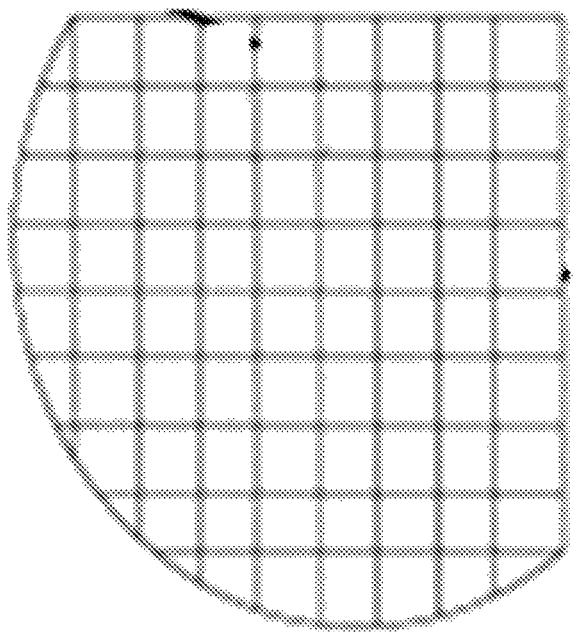

FIG. 4 is a flow chart illustrating the method of production of the carbon nano tube filter, according to one embodiment herein. The process starts with synthesis of highly purified carbon nano tube (401). The step is followed by a surface modification of carbon nano tribe and catalyst nano particle (402). Further the nano catalytic metal oxides are optimized (403). The next step is the growth of special nano metallic sensor to make smart acting devices (404) and the increment of surface addition of metal-metal oxides nano particles (405). The next step is optimization and deposition of nano metal oxides on the surface of certain nano catalysts (406). Further the surface by carbon nano-fibers and nano metal oxide for nano structures isolation (407). The next step involves increase in surface area coefficient by creating a nano electronic platform specific (408). Further the nanomaterials are coated on the internal surface of monoliths and the entire structure in subjected to sintering in a vacuum furnace (409).

The adsorbent carbon nano tube based smart filter built in the current project is made up of two parts. The two parts are an internal part and an external part. The external part, indeed, doesn't have any influence on the activities of adsorbent tube, and it is only designed for implementation of pollution test, protection of adsorbent tube against impact and also integration of the structure. This part is made up of a 4 inches tube, four flanges and two conversion device of 3 to 4 numbers. All pieces are build upon/using 304 stainless steel. The above mentioned components are used as an external enclosure to protect the adsorbent tube, after welding. In the internal part, 3 monolith tubes are used as a basis (the product of Kerning Company). Each monolith tube is of 9 centimeters in diameter and 17 centimeters in height which has a reticular structure. The solutions of palladium and radium have been sprayed on the one of the monolith tubes and then they were placed in the teklis or calcination furnace. In the case of two other monolith tubes, multi-walled carbon nano tube structures including adhesive material and metals such as cobalt and molybdenum are used. The order of component placement in the storage compartment is as follows:

1. First nano catalyst—(number 1)—(optimized carbon nano tubes+adhesive material+cobalt oxide and nano oxides of specific metals)

2. Second nano catalyst—(number 2)—(optimized carbon nano tubes+adhesive materials+cobalt-cobalt oxide and nano oxides of specific metals)
3. monolith cylinders covered by palladium and radium oxides.

In the above mentioned structure, emissions caused by bus exhaust, are exposed to contact with the active metals such as palladium and molybdenum in this situation. The carbon nano tubes are highly absorptive and the process of desulfurization happens on the cobalt-molybdenum catalysts. In these conditions, density of sulfide and oxides is decreased (as the next poisoning oxidizing catalysts), so the time of activity of the next catalyst is increased and as a result, the general life of the tube is increased and long.

In the construction of nano catalyst, an insemination process or method is used. This method involves placing the active metals such as cobalt and molybdenum on the carbon nano tube base. This method is a well-known method as one of the commercial approaches in the construction of catalysts. In this method, the desired metal containing combinations, such as cobalt and molybdenum in this project, are selected to be situated on the support of the nano tube. These combinations which are called substrates are generally metal salts which are inorganic salts in aqueous phase. 9 gm of cobalt nitrate is dissolved in 100 ml distilled water. Further 11 gm of ammonium hepta molybdate is added for a non catalyst. The salts are dissolved in distilled water using heat, and then nano tubes are dipped/immersed in the produced solution. The solution penetrates into the cavities of carbon nano tubes and also into the surfaces of the carbon nano tubes. The solution is thoroughly is absorbed. The obtained substance, which is highly moist, is dried in the temperature of about 120° C. and then calcified. It is necessary to be mentioned that, in the insemination method, there are so many factors which influence on the activity of catalysts such as type of selected substrate, the order of combination of metals in multi metal combinations, conditions of calcinations. Another method for the solution preparation for carbon nano tube involves dissolving 4.3 gm cobalt nitrate in 1.00 ml distilled water and 47.4 gm ammonium hepta molybdate. The prepared solution is added to carbon nano tubes by spraying the solution. The solution thus enters into the pores of the cylinder.

Due to the fact that carbon nano tubes are black, solid tiny powders; they cannot be applied in adsorbent tubes by preserving their appearance. Apparently nano catalysts which are made with the supports of carbon nano tubes are powder-like in appearance. By the application of powder like structures, all the nano tubes exit, at early moments after being connected to the exhaust.

In the production of the first nano catalyst (number 1), the phenolic resin with the brand of IL 800 is used as a binder for connecting and shaping the carbon nano tubes. The phenolic resin is a product of Rezita Company. The inner part of the monolith cylinder is covered by 200 grams of resin and 2 grams of carbon multi-walled carbon nano tubes. For mixing the carbon nanotube and the phenolic resin properly, a mechanical mixer is used for 0.5 of an hour. After entering the resin and carbon nano tube to the cavities of monolith cylinder, the complex is entered into a furnace. The temperature of the furnace is increased up to 300° C. more than the room temperature, and it is maintained for 4 hours in this temperature. The cylinder is taken out of the furnace, after the temperature of the furnace gradually decreases to the room temperature. After this stage, the resin is destroyed and the resin surrounds the carbon nano tubes like a carbon chain. Then a solution containing 5.2 grams of ammonium heptamolybdate and 4.3 grams of cobalt nitrate in 47.4 grams of distilled water is provided and is sprayed to the cavities of the cylinder produced in the previous phase. As the insemination finishes, the calcinations operation is done in the furnace. For the calcinations, the temperature of furnace is increased up to 300° C. more than temperature of environment and is kept in this temperature for 4 hours.

FIG. 5A-FIG. 5D show an internal structure of the carbon nano tube filter, and magnified views of a carbon nano tube in the nano filter system, according to one embodiment herein. The figure represents an enhanced view of the carbon nano tube with a metal-metal oxide catalyst. The enhanced view further shows the carbon nano tube with the metal-metal oxide catalysts and the porous hydrophob layers. With respect to FIG. 5A-FIG. 5D, the catalyst structure has carbon nano tube coated with a metal-metal oxide catalyst and porous hydrophob layers.

FIG. 6A-FIG. 6D shows a perspective view of a carbon nano tube filter system and magnified views of a carbon nano tube in the nano filter system, according to one embodiment herein. The nano filter comprises a cover plate, a sliding support, a frame and a fiber mesh. The fiber mesh further comprises a porous hydrophob layer, a metal-metal oxide catalyst and a carbon nano tube. With respect to FIG. 6A-FIG. 6D, the filter system comprises a casing provided with a cover plate on four sides and two frames for holding the nano filters on the two remaining sides which are arranged opposite to each other. The filters are provided on a sildable frame. The filters are arranged as a fiber mesh and the fiber mesh is fixed to the slidable frames. The mesh includes carbon nano tubes coated with a metal-metal oxide catalyst and porous hydrophob layers.

Figure 7:
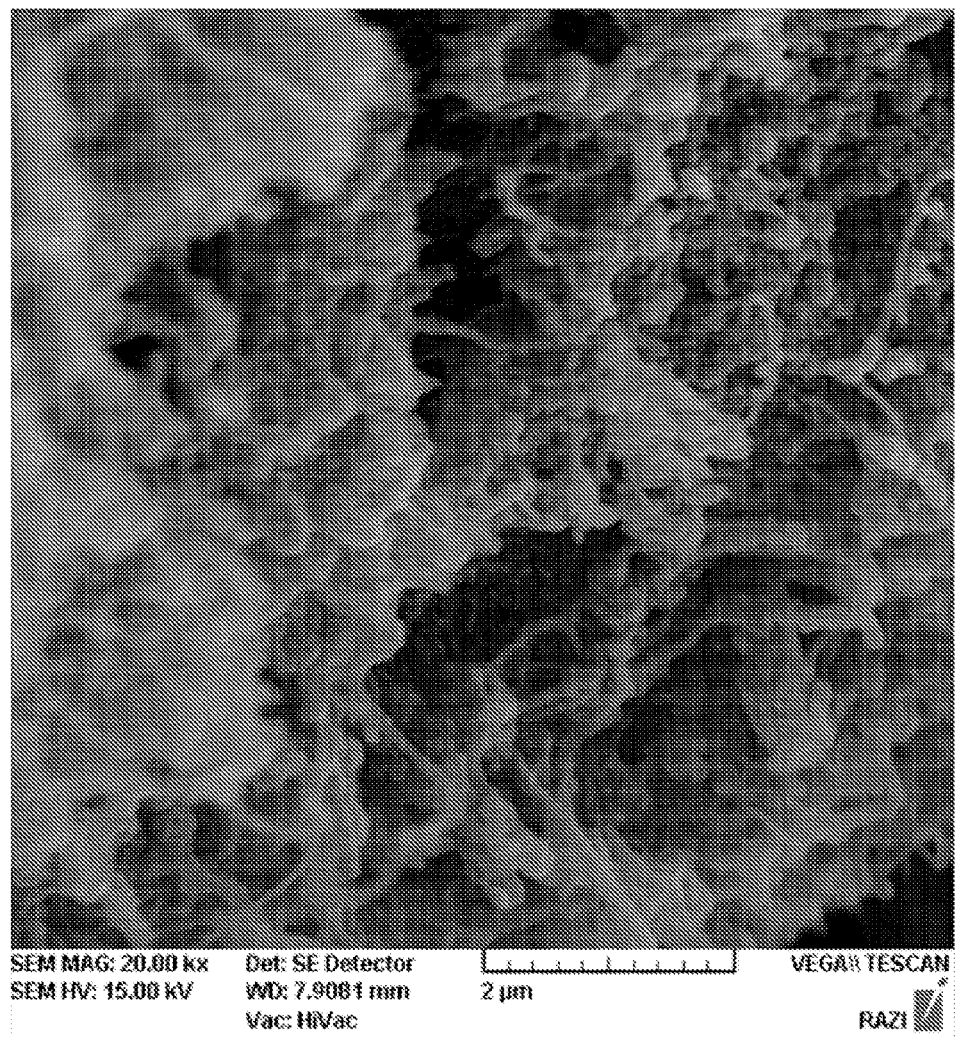
FIG. 7 shows the scanning electron microscope Image of nano catalyst with a magnification of 20000, according to one embodiment herein.

FIG. 7 shows the scanning electron microscope (SEM) image of nano catalyst, according to one embodiment herein. The image of nano catalyst is taken with a SEM magnification of 20000. The superficial structure of carbon nano tube as observed under SEM illustrates that there is no change after calcinations and placement of active metals, and metal components surrounding the carbon nano tubes.

Figure 8:
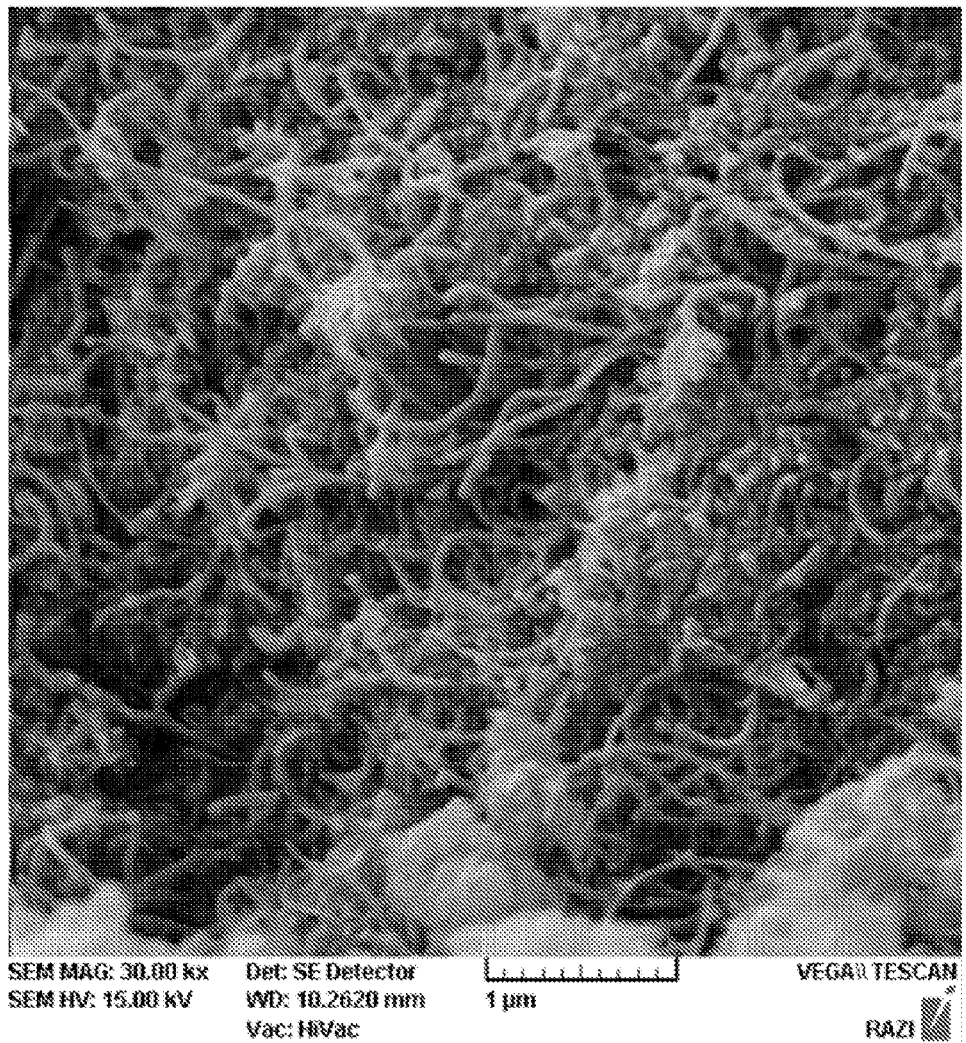
FIG. 8 shows the scanning electron microscope Image of nano catalyst with a magnification of 30000, according to one embodiment herein.

FIG. 8 shows the scanning electron microscope image of nano catalyst, according to one embodiment herein. The image of nano catalyst is taken with a SEM magnification of 30000. The superficial structure of carbon nano tube as observed under SEM illustrates that there is no change after calcinations and placement of active metals, and metal components surrounding the carbon nano tubes.

Figure 9:
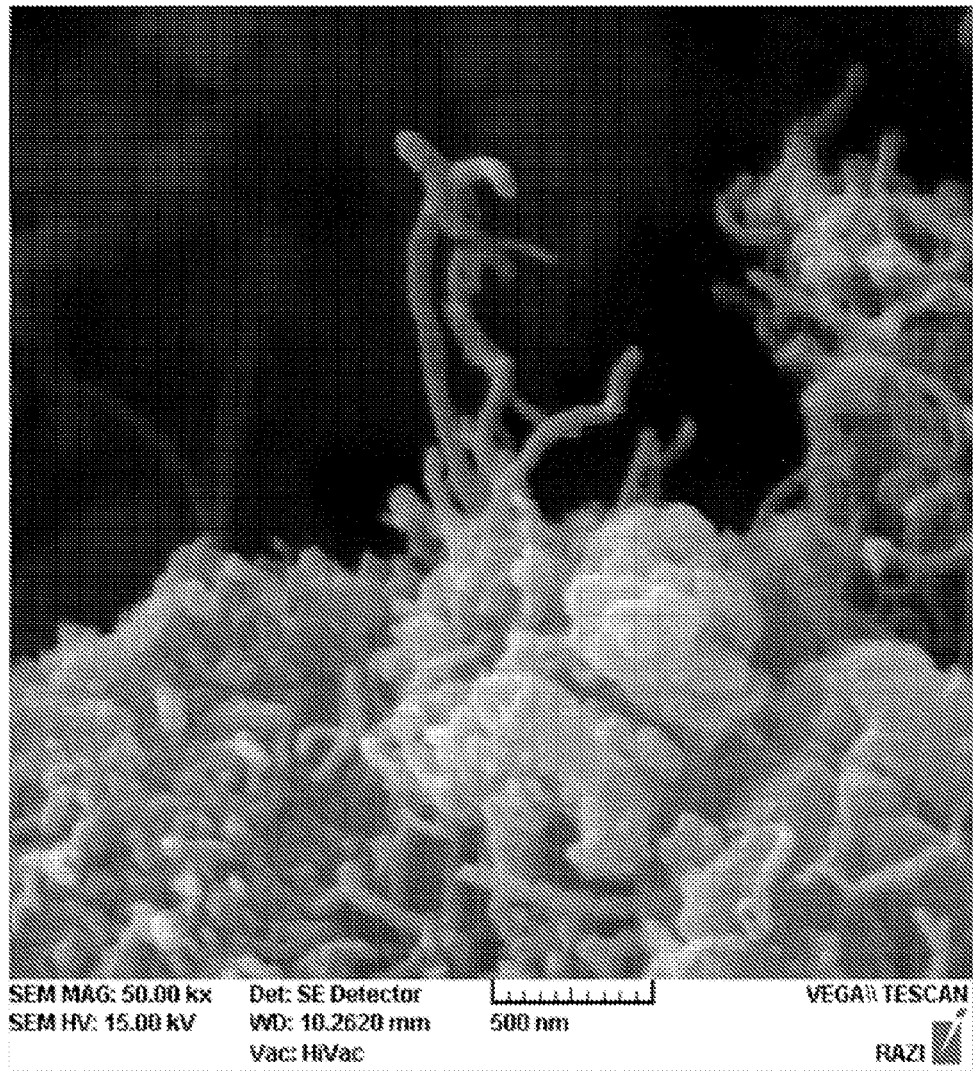
FIG. 9 shows the scanning electron microscope Image of nano catalyst with a magnification of 50000, according to one embodiment herein.

FIG. 9 shows the scanning electron microscope image of nano catalyst, according to one embodiment herein. The image of nano catalyst is taken with a SEM magnification of 50000. The superficial structure of carbon nano tube as observed under SEM illustrates that there is no change after calcinations and placement of active metals, and metal components surrounding the carbon nano tubes.

After the synthesis and optimization, the nano filters are investigated for the influence of amount of pollutants on the nano filter. As the nano filter are constructed and are installed in the metal holder pipe of the vehicle, the influence of the catalyst nano filter on the emissions of a mega trans is evaluated (production of Iran Khodrodizel, belonging to the bus fleet). The amount of soot is measured by AVL system, and other pollutants (carbon monoxide, carbon dioxide, nitrogen monoxide, nitrogen dioxide, sulfur dioxide and sulfide hydrogen) are measured by MRU VARIOPLUS 294 372 system. The amount of pollutants is measured by Air Quality Control Company. The influence of nano catalytic converter is evaluated one hour later after being installed on the exhaust.

As shown in FIG. 7-9, the amount of pollutants decreased after installation of catalyst converter. As an example, the amount of the soot emissions decreased by 99.1%.

According to FIG. 9, after installation of catalyst converters, the amount emission is reduced by 20%. On the other hand, amount of all the other emissions is decreased, which is an evidence for the activity of catalyst. In adsorbent nano filter number 2, nano catalysts exhibit considerable activity in decreasing the amount of pollutants such as dioxide carbon and monoxide carbon.

Figure 10:
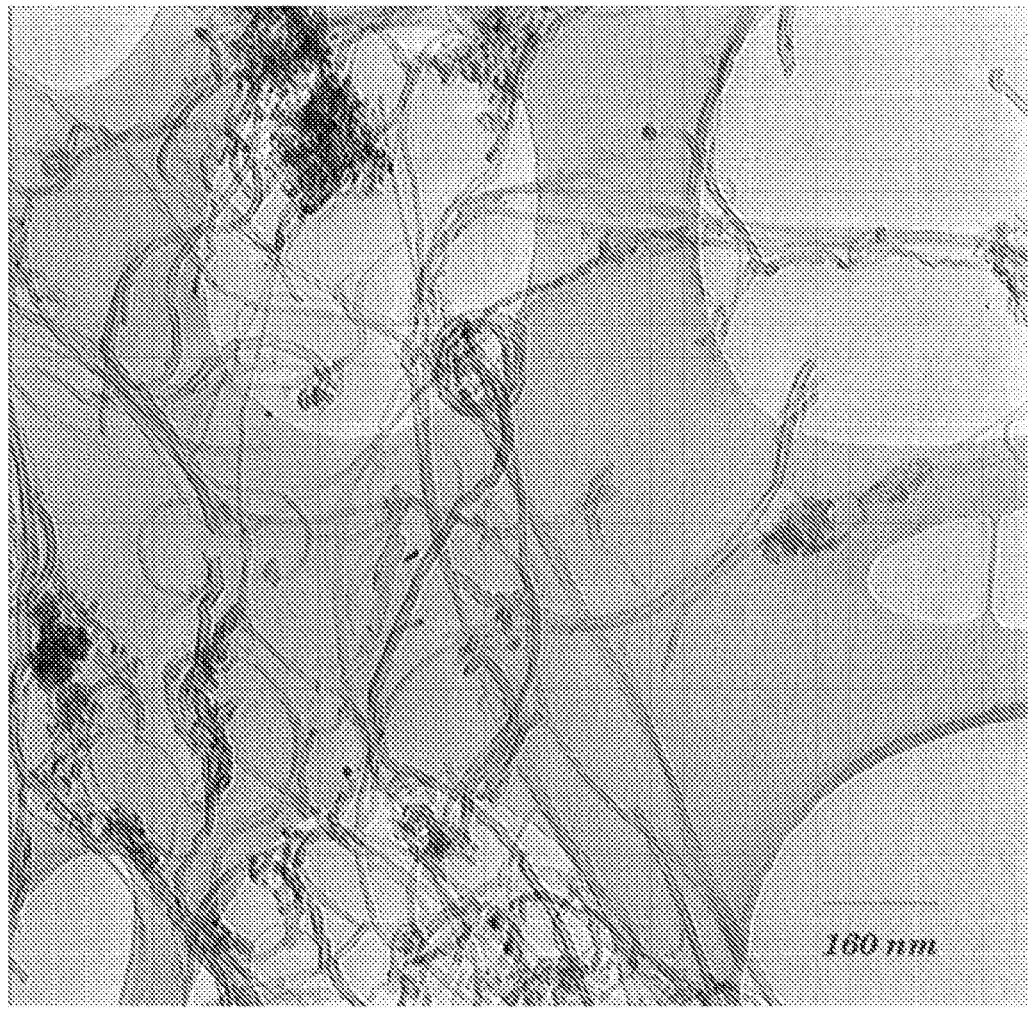
FIG. 10 shows the transition electron microscope image of a multi walled carbon nano tube, according to one embodiment herein.

FIG. 10 shows the transition electron microscope (TEM) image of carbon nano tube, according to one embodiment herein. The TEM image results show the measurements of the diameter and thickness of the nano tube walls.

Figure 11:
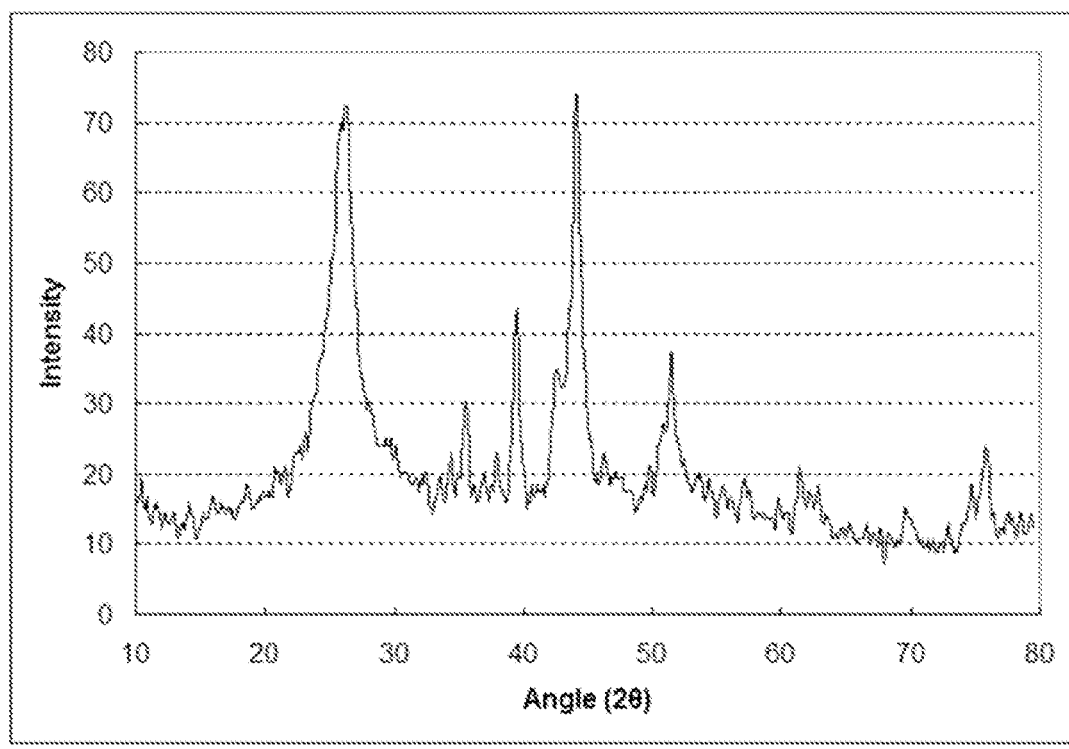
FIG. 11 shows XRD spectrum of nano catalyst, according to one embodiment herein.

FIG. 11 shows XRD spectrum of nano catalyst, according to one embodiment herein. The XRD spectrum reveals that multi walled carbon nano tube acts as a support for carbon, $Mo_2C$ and cobalt in nano catalyst. The identified peaks are shown in the table below:

| Status of the peak θ(2) | Name of the identified substance | Intensity of the peak (%) |
|---|---|---|
| °26/1444 | Carbon | 67/08 |
| °34/3346 | Molybdenum carbide | 8/54 |
| °39/3961 | Molybdenum carbide | 51/62 |
| °44/0984 | Cobalt | 100 |
| °51/3834 | Cobalt | 27 |

Further the size of the crystals is calculated by Sherrer equation.

$$L = \frac{K \cdot \lambda}{B_m \cos\theta}$$

In the above equation, L stands for the size of crystal in terms of angstrom, K is the constant value of the Sherrer equation, $B_m$ is the width of the peak in radians, $\lambda$ is x-ray wavelength, and $\theta$ is the angle for forming the pick. According to the equation the size of the existing crystals in nano catalyst is calculated as shown in the table below:

| Substance name | Size of crystal (mm) |
|---|---|
| Molybdenum carbide | 20.021 |
| Cobalt | 13.269 |

Figure 12:
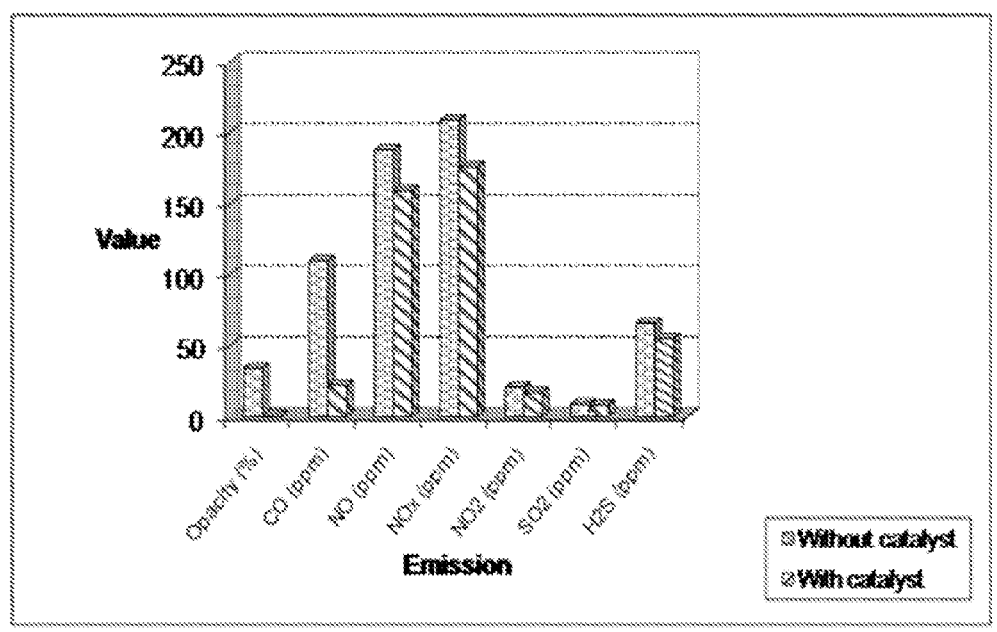
FIG. 12 shows a graphical representation indicating a comparison of the emissions with and without nano filter, according to one embodiment herein.

FIG. 12 shows the graphical representation comparing the emissions with and without nano filter, according to one embodiment herein. The emissions from the automobile are compared before and after installation of the nano-filter with and without catalyst. The report is based on the reports of Air Quality Control Company. The results show that the emissions are low when catalyst is applied in the nano filter.

Figure 13:
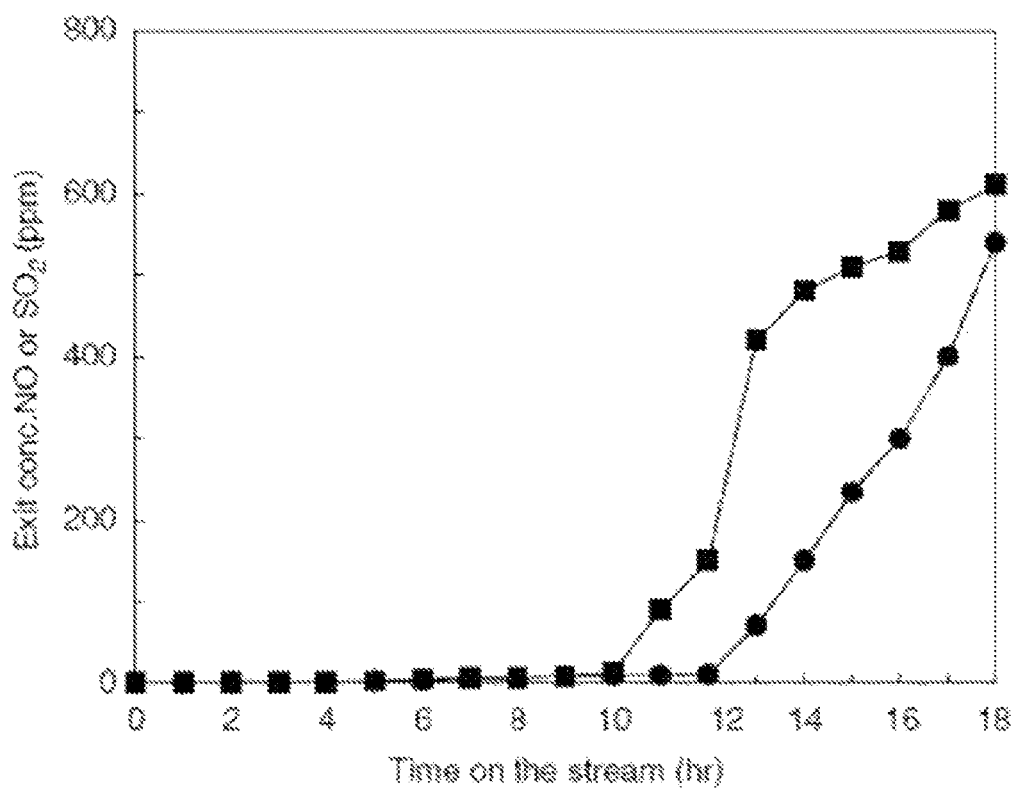
FIG. 13 shows the graphical representation indicating a comparison of the NOx or SO2 amount with nano filter per time, according to one embodiment herein.

FIG. 13 shows the graphical representation comparing the carbon dioxide amount with and without nano filter, according to one embodiment herein. The figure shows the effect of the intelligent nano filter. The results show that the carbon dioxide emissions are low, when the intelligent nano filter is applied against emissions.

Figure 14:
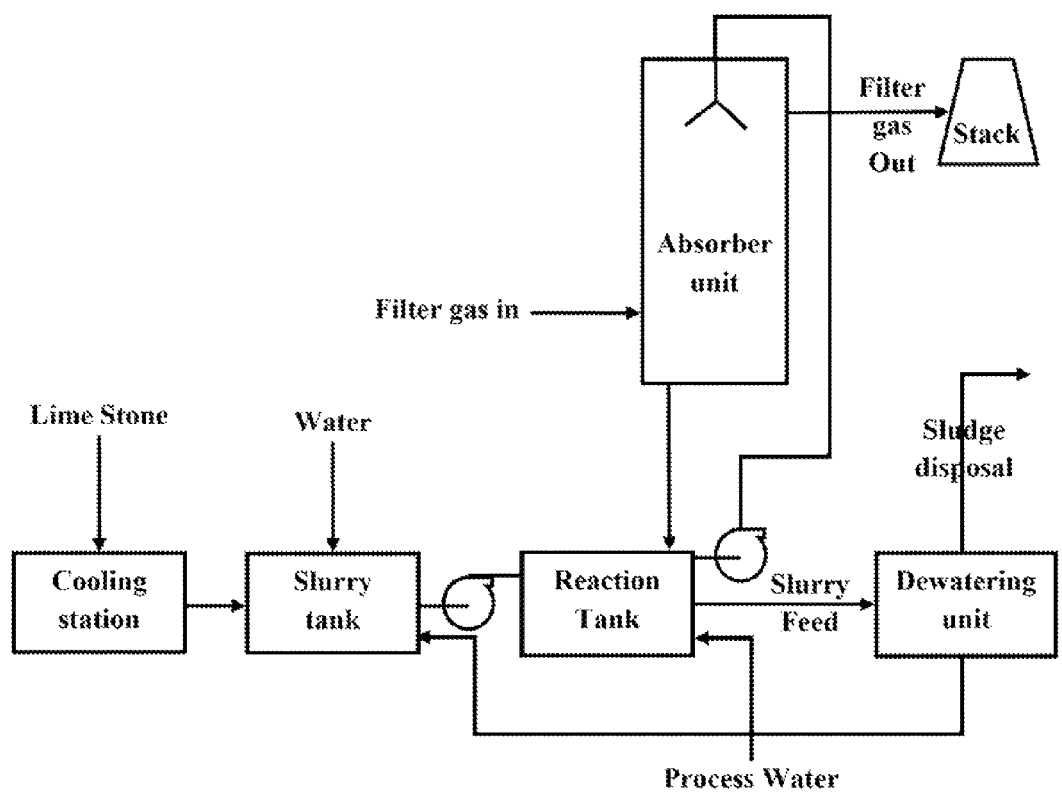
FIG. 14 shows the graphical representation indicating a comparison wet limestone process, according to one embodiment herein.

FIG. 14 shows the graphical representation comparing the percentage of gaseous hydrocarbon emission with and without nano filter, according to one embodiment herein. The results show that the emissions are low when catalyst is applied in the nano filter. The graph shows the carbon dioxide emissions are low in the presence of intelligent nano filter. The carbon dioxide emissions are comparatively high when the intelligent nano filters are not applied.

Figure 15:
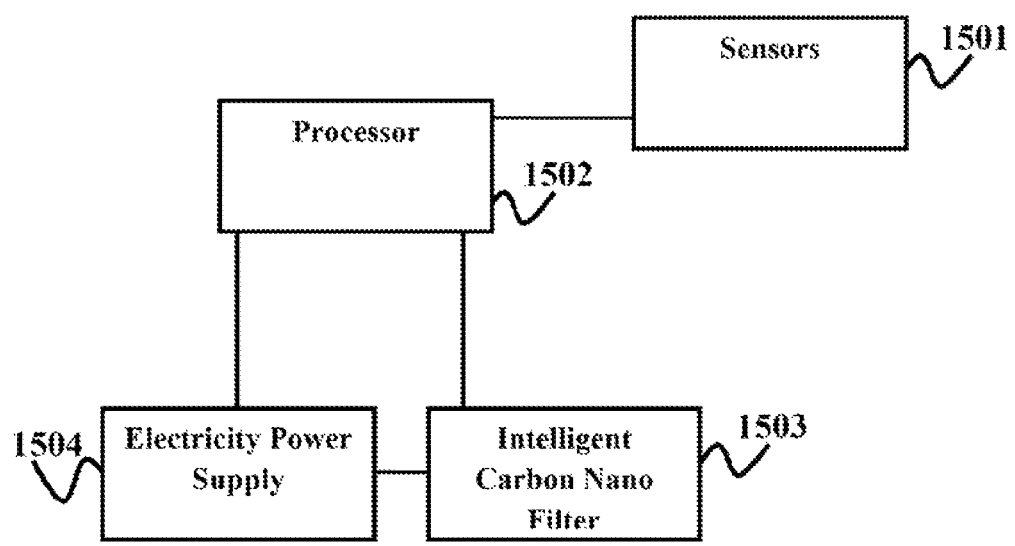
FIG. 15 shows the block circuit diagram of carbon nano filter system, according to one embodiment herein.
Figure 16:
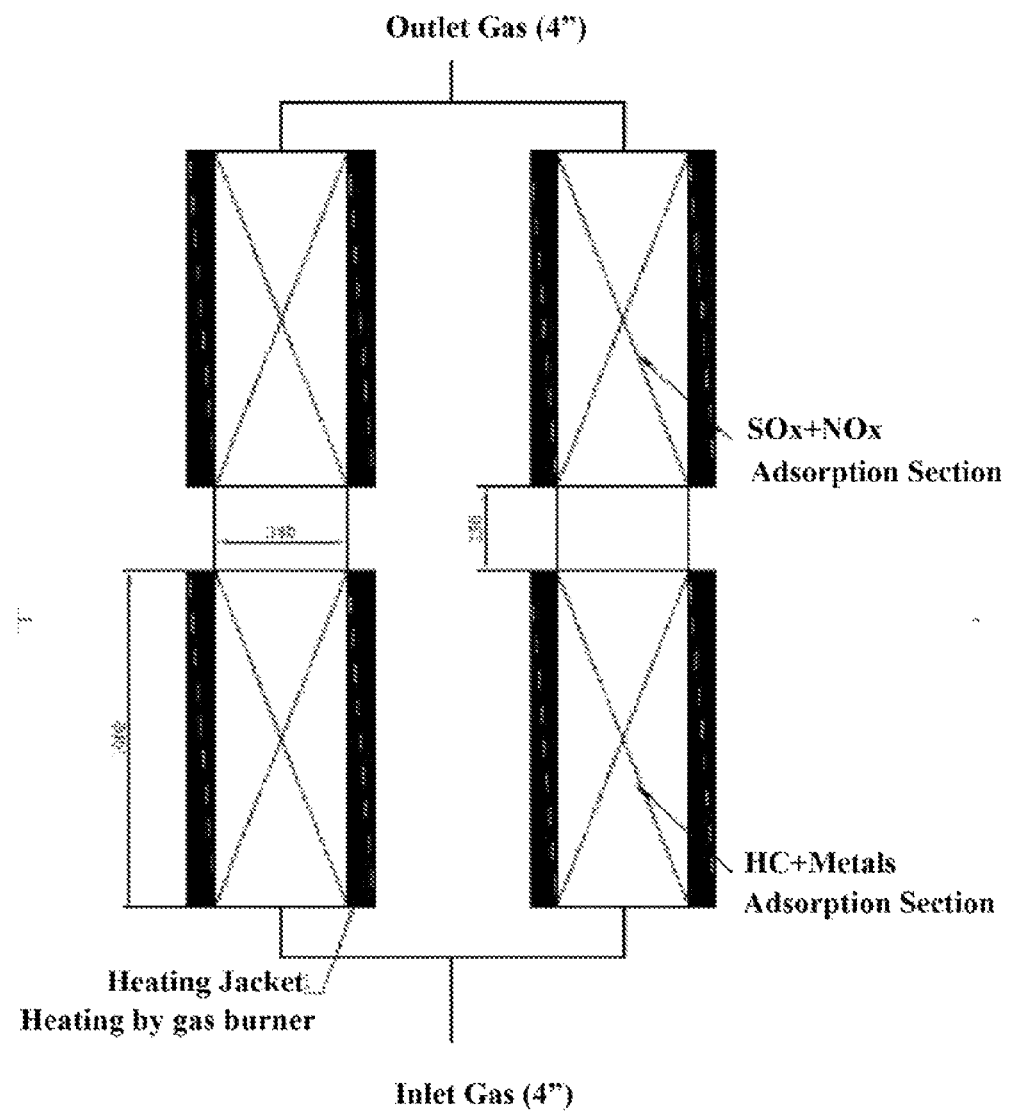
FIG. 16 shows a block diagram of the gas molecules NOx, SOx, HC storage at power applications, according to an embodiment herein.
Figure 17A:
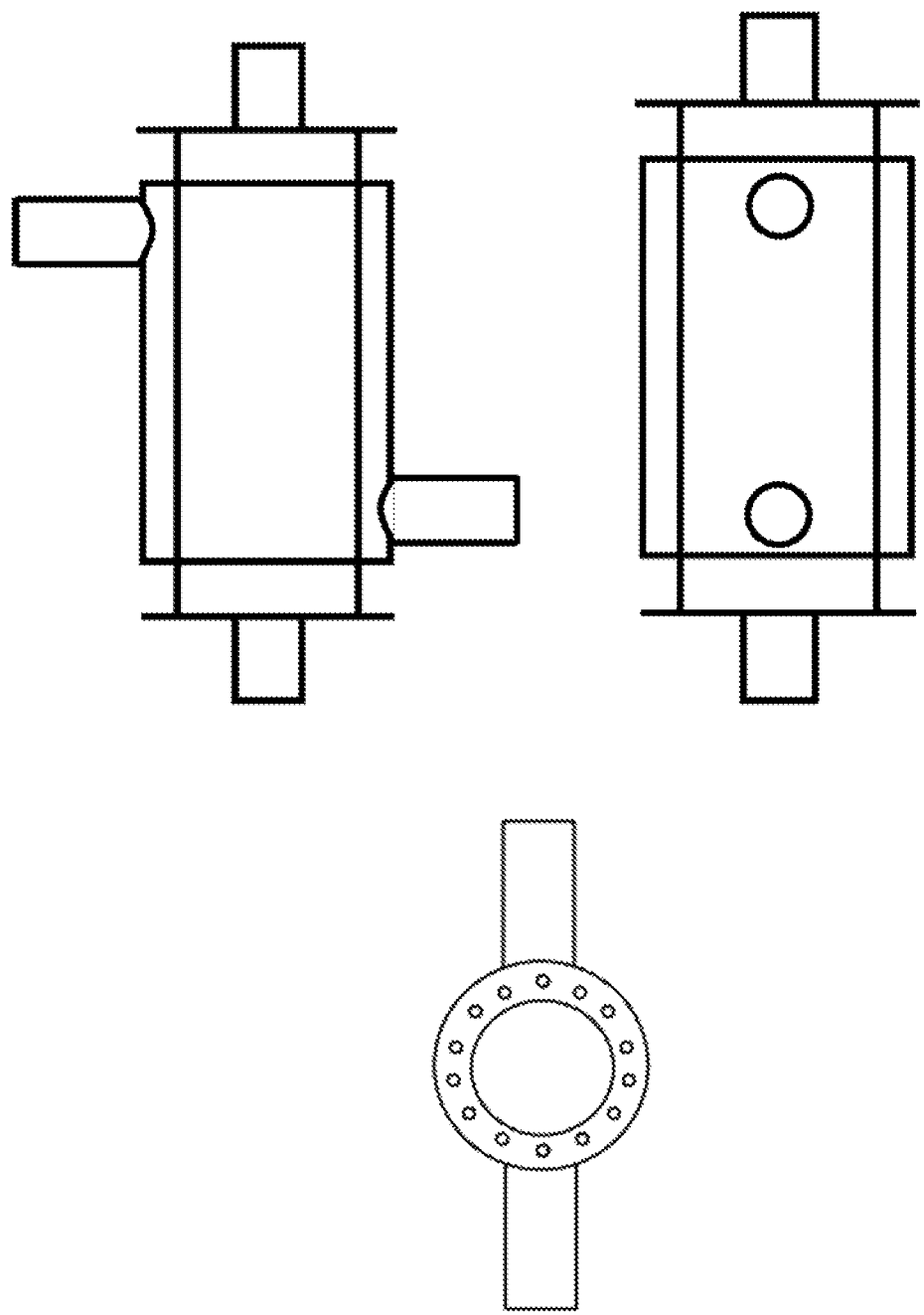
FIG. 17A-FIG. 17D show a side and top views of a casing and jacket, bundle chamber, burner and bundle casing in a sample of twenty inch pipe to absorb powerhouse pollutants, according to an embodiment herein.
Figure 17B:
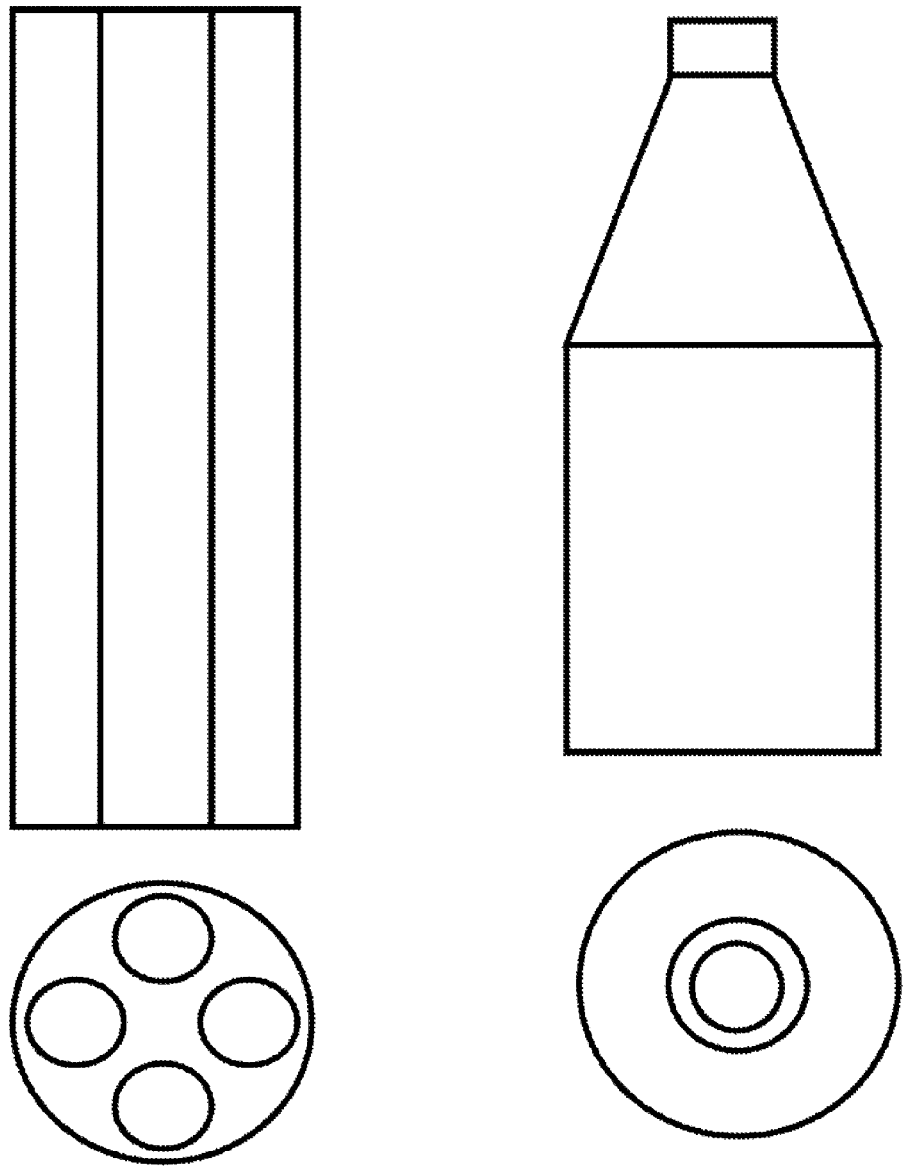
Figure 17C:
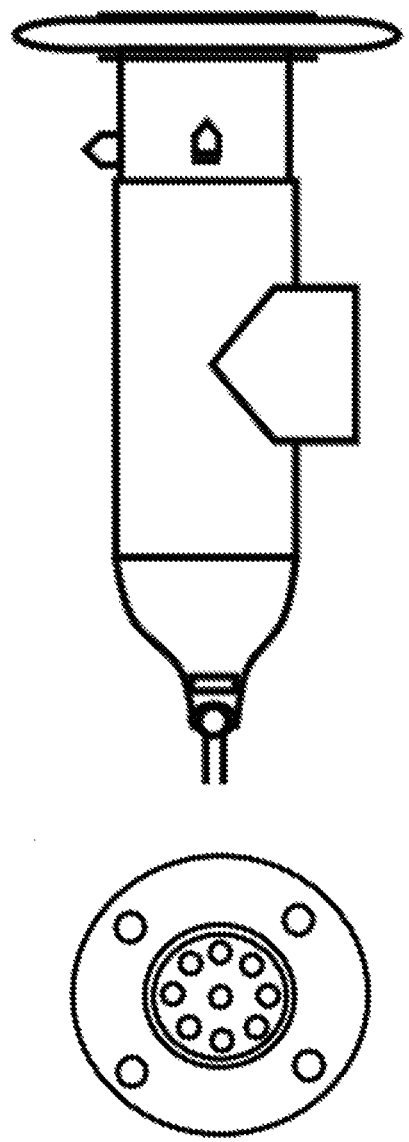
Figure 17D:
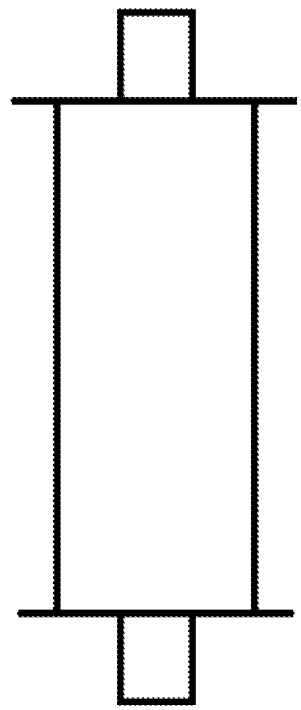
Figure 17D:
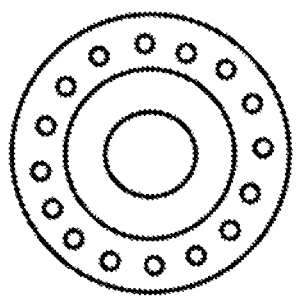
Figure 18:
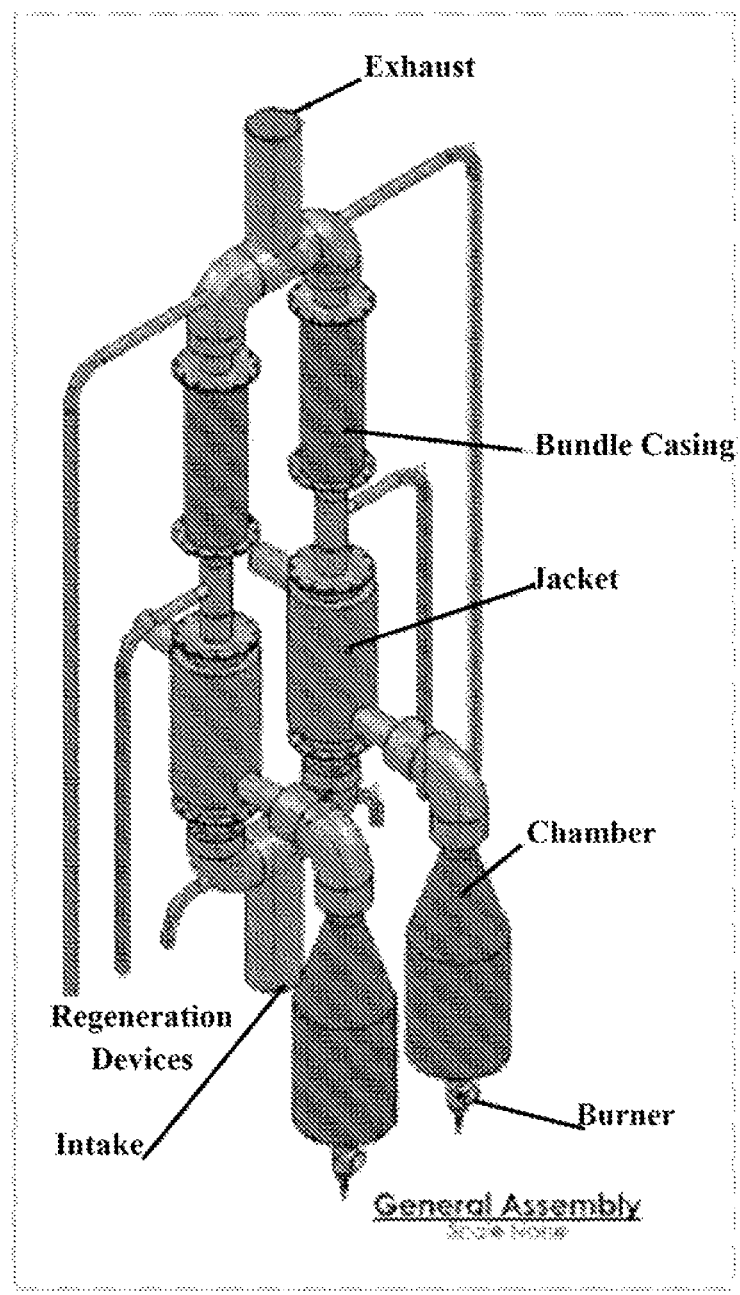
FIG. 18 shows a perspective view of an absorb pollutants sulfur dioxide and sulfuric acid production unit (Including process flow diagram), according to an embodiment herein.
Figure 19:
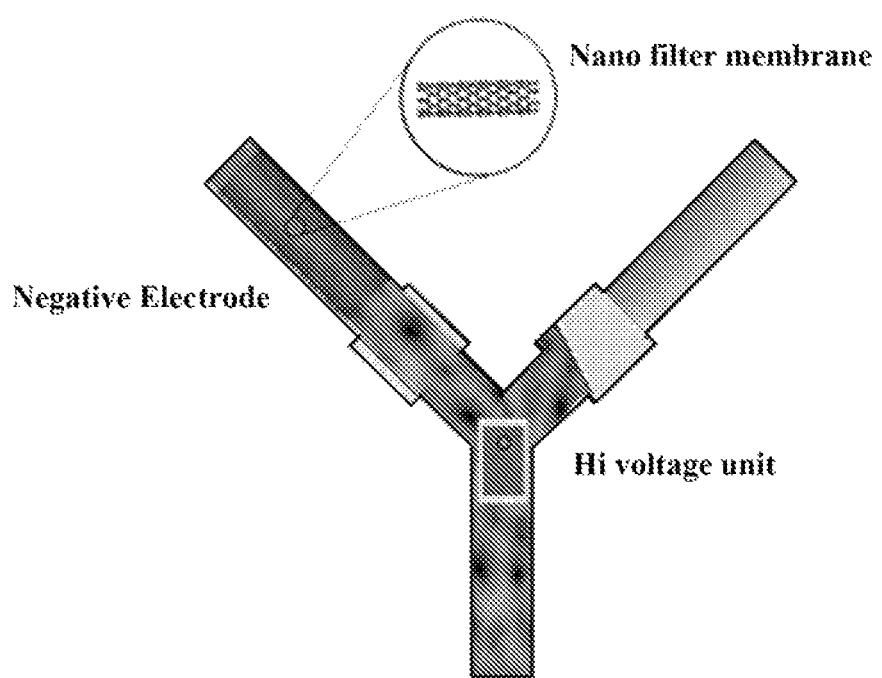
FIG. 19 shows a schematic view of a Hydrocarbon Emission Control Technical plans and how to attract a nano filter household sample with Nano-electromechanical systems and controls membrane filter carbon nanotubes with electromagnetic waves, according to an embodiment herein.

FIG. 15 shows the block circuit diagram of carbon nano filter system, according to one embodiment herein. The circuit comprises a sensor 1501, a processor 1502, a filter 1503 and an electricity power supply 1504. The sensors detect the concentration of the contaminants in the exhaust and in the environment dynamically and forward the inputs to the processor. The processors regulates a power supply which is a high frequency circuit to vary the voltage applied to the carbon nano tubes dynamically to generate a high frequency arc to absorb the contaminants. The sensors are chemical sensors and are formed on the surface of the carbon nano tubes. The circuit estimates the amount of concentration and type of compositions based on the creation of electromagnetic arc.

The adsorbent carbon nano tubes disclosed in the embodiments herein has a low speed in saturation, a high level of adhesion strength and absorption. The nano tube based filters of the embodiments herein analyses and treats toxic pollutants intelligently, dynamically and smartly based on the measured contamination level with the chemical sensors to dynamically vary the voltage applied to the carbon nano tubes using a high frequency circuit to generate a high frequency arc to absorb all the pollutants. The nano tube based filters of the embodiments herein has a capacity of more than 97 percent for absorption and controlling of pollutants. The system is capable of maintaining the efficiency of the filter for a period of 9 months and the filter needs charging only once in the next 9 months.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for fabricating a carbon nano-filter system for removing toxic pollutants and hydrocarbons, the method comprising the steps of:
   synthesizing and purifying single-walled or multi-walled carbon nanotubes;
   spraying palladium and rhodium nanoparticles on the surfaces of the carbon nanotubes,
   growing a plurality of non-metallic sensors on the nanotubes;

coating the nanotubes with a hydrophobic layer of metal-metal oxide nanoparticles to form nano-catalyst structures having an increased surface area coefficient, drying the nano-catalyst structures at a temperature of 120° C.;

mixing the dried nano-catalyst structures with a phenolic binder resin to form catalytic nanoparticles;

coating an interior surface of a plurality of monolithic structures with the catalytic nanoparticles;

calcining the coated monolithic structures in a vacuum furnace;

cooling the calcined monolithic structures; and spraying a solution on the interior surface of calcined monolithic structures to coat the interior surface of the calcined structures with metal-metal oxide nanoparticles, wherein the solution comprises 5.2 grams of ammonium heptamolybdate and 4.3 grams of cobalt nitrate in 47.4 grams of distilled water, wherein the metal-metal oxide nanoparticles comprise cobalt oxide, palladium and molybdenum oxide, and wherein the cobalt oxide is derived from the cobalt nitrate and wherein the molybdenum is derived from the ammonium heptamolybdate.

2. The method according to claim 1, wherein the cobalt oxide added at a weight percentage of 2.6031.

3. The method according to claim 1, wherein the molybdenum is added at a weight percentage of 3.63.

4. The method according to claim 1, wherein the monolithic structures are calcinated at a vacuum furnace at 300° C. for 4 hours.

* * * * *